(12) United States Patent
Israel et al.

(10) Patent No.: US 8,166,904 B2
(45) Date of Patent: May 1, 2012

(54) DELIVERY SYSTEMS FOR PRESSURE PROTECTING AND DELIVERING A SUBMERGED PAYLOAD AND METHODS FOR USING THE SAME

(75) Inventors: Steven Craig Israel, Durham, NC (US); Dominic Caza Germana, Durham, NC (US); Craig A. Greiner, Pittsboro, NC (US); Frederick Vosburgh, Durham, NC (US)

(73) Assignee: iRobot Corporation, Bedford, MA (US)

( * ) Notice: Subject to any disclaimer, the term of this patent is extended or adjusted under 35 U.S.C. 154(b) by 151 days.

(21) Appl. No.: 12/511,676

(22) Filed: Jul. 29, 2009

(65) Prior Publication Data
US 2010/0107959 A1 May 6, 2010

Related U.S. Application Data

(63) Continuation-in-part of application No. 12/332,734, filed on Dec. 11, 2008.

(60) Provisional application No. 61/084,679, filed on Jul. 30, 2008, provisional application No. 61/013,184, filed on Dec. 12, 2007.

(51) Int. Cl.
*B63G 8/28* (2006.01)

(52) U.S. Cl. .................... 114/319; 89/1.809; 277/628

(58) Field of Classification Search .......... 89/1.809, 89/1.81; 114/312, 316, 319; 277/314, 608, 277/612, 626, 628, 644, 647; 367/1, 131, 367/188
See application file for complete search history.

(56) References Cited

U.S. PATENT DOCUMENTS

| | | | |
|---|---|---|---|
| 4,189,786 A | 2/1980 | Adler | |
| 5,666,900 A | 9/1997 | Carroll et al. | |
| 5,918,307 A | 6/1999 | Cipolla | |
| 6,058,071 A | 5/2000 | Woodall et al. | |
| 6,254,445 B1 | 7/2001 | Jones | |
| 6,484,618 B1 | 11/2002 | Dubois | |
| 6,561,522 B1* | 5/2003 | Radelet et al. | 277/314 |
| 6,701,819 B1 | 3/2004 | Williams et al. | |
| 6,711,095 B1 | 3/2004 | Daniels | |
| 6,738,314 B1 | 5/2004 | Teeter et al. | |
| 6,813,218 B1 | 11/2004 | Antonelli et al. | |
| 6,899,583 B2 | 5/2005 | Barden | |
| 6,961,657 B1 | 11/2005 | Wernli et al. | |
| 7,032,530 B1 | 4/2006 | Ansay et al. | |
| 7,140,289 B1 | 11/2006 | Ansay et al. | |
| 7,496,000 B2 | 2/2009 | Vosburgh et al. | |
| 7,496,002 B2 | 2/2009 | Vosburgh | |

* cited by examiner

*Primary Examiner* — Lars A Olson
(74) *Attorney, Agent, or Firm* — Myers Bigel Sibley & Sajovec, PA

(57) ABSTRACT

A payload delivery unit for protecting and delivering a payload submerged in a submersion medium comprises a container including a pressure resistant shell and a resilient seal device. The shell defines a containment chamber and includes first and second shell members having opposed first and second sealing faces, respectively. The seal device engages and is interposed between the first and second sealing faces. The container is configured and constructed such that: when the submersion medium applies an exterior pressure to the first and second shell members such that a shell pressure differential, defined as the exterior pressure less an interior pressure of the containment chamber, exceeds a prescribed pressure, the first and second shell members compressively load and deform the seal device to effect a seal between the first and second shell members that prevents ingress of the submersion medium into the containment chamber; and when the shell pressure differential is less than the prescribed pressure, the seal device elastically rebounds to separate the first and second shell members to permit ingress of the submersion medium into the containment chamber.

20 Claims, 15 Drawing Sheets

DELIVERY SYSTEMS FOR PRESSURE PROTECTING AND DELIVERING A SUBMERGED PAYLOAD AND METHODS FOR USING THE SAME

RELATED APPLICATION(S)

This application claims the benefit of and priority from U.S. Provisional Patent Application No. 61/084,679, filed Jul. 30, 2008, and is a continuation-in-part (CIP) application claiming priority from U.S. patent application Ser. No. 12/332,734, filed Dec. 11, 2008, which claims the benefit of and priority from U.S. Provisional Patent Application Ser. No. 61/013,184, filed Dec. 12, 2007, the disclosures of which are incorporated herein by reference.

STATEMENT OF GOVERNMENT SUPPORT

This invention was made with support under Small Business Innovation Research (SBIR) Program No. N00014-07-C-0197 awarded by the United States Navy Office of Naval Research. The Government has certain rights in the invention.

FIELD OF THE INVENTION

The present invention relates to submersible devices and, more particularly, to systems for protecting and delivering submersible payloads.

BACKGROUND OF THE INVENTION

Monitoring littoral seas without being detected can be desirable in times of conflict. In such cases, autonomous submersible monitoring and communications systems can provide much needed intelligence. While such devices can be deployed without detection, communicating the results of monitoring by devices submerged in the sea is problematic. Sonar provides low bandwidth over short ranges and radio communications, at all but the highest powers and lowest data rates, are blocked by salt water. Effective communication requires therefore that an antenna be raised above the sea. A variety of systems have been described for raising an antenna above the sea, but they are either expensive, impractical, or readily detected, making them unsuitable for exporting information without being detected.

SUMMARY OF THE INVENTION

According to embodiments of the present invention, a payload delivery system for protecting and delivering a payload submerged in a submersion medium includes a containment system. The containment system includes a container and a dehiscing system. The container includes a pressure-resistant shell defining a sealed containment chamber. The dehiscing system is operative to dehisce the shell to open the containment chamber to the submersion medium responsive to a prescribed event and/or a prescribed environmental condition.

According to method embodiments of the present invention, a method for protecting and delivering a payload submerged in a submersion medium includes providing a containment system including: a container including a pressure-resistant shell defining a sealed containment chamber; and a dehiscing system. The method further includes: mounting the payload in the containment chamber; submerging the container with the payload mounted in the containment chamber; and thereafter dehiscing the shell using the dehiscing system to open the containment chamber to the submersion medium responsive to a prescribed event and/or a prescribed environmental condition.

According to embodiments of the present invention, a payload delivery unit for protecting and delivering a payload submerged in a submersion medium comprises a container including a pressure resistant shell and a resilient seal device. The shell defines a containment chamber and includes first and second shell members having opposed first and second sealing faces, respectively. The seal device engages and is interposed between the first and second sealing faces. The container is configured and constructed such that: when the submersion medium applies an exterior pressure to the first and second shell members such that a shell pressure differential, defined as the exterior pressure less an interior pressure of the containment chamber, exceeds a prescribed pressure, the first and second shell members compressively load and deform the seal device to effect a seal between the first and second shell members that prevents ingress of the submersion medium into the containment chamber; and, when the shell pressure differential is less than the prescribed pressure, the seal device elastically rebounds to separate the first and second shell members to permit ingress of the submersion medium into the containment chamber.

According to method embodiments of the present invention, a method for protecting and delivering a payload submerged in a submersion medium includes providing a payload delivery unit comprising a container including a pressure resistant shell and a resilient shell device. The shell defines a containment chamber and includes first and second shell members having opposed first and second sealing faces, respectively. The seal device engages and is interposed between the first and second sealing faces. The method further includes: submerging the container with the payload mounted in the containment chamber; maintaining the payload delivery unit in a sealed condition wherein the submersion medium applies an exterior pressure to the first and second shell members such that a shell pressure differential, defined as the exterior pressure less an interior pressure in the containment chamber, exceeds a prescribed pressure, whereby the shell members compressively load and deform the seal device to effect a seal between the first and second shell members that prevents ingress of the submersion medium into the containment chamber; and thereafter causing the shell pressure differential to become less than the prescribed pressure, whereupon the seal device elastically rebounds to separate the first and second shell members to permit ingress of the submersion medium into the containment chamber.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
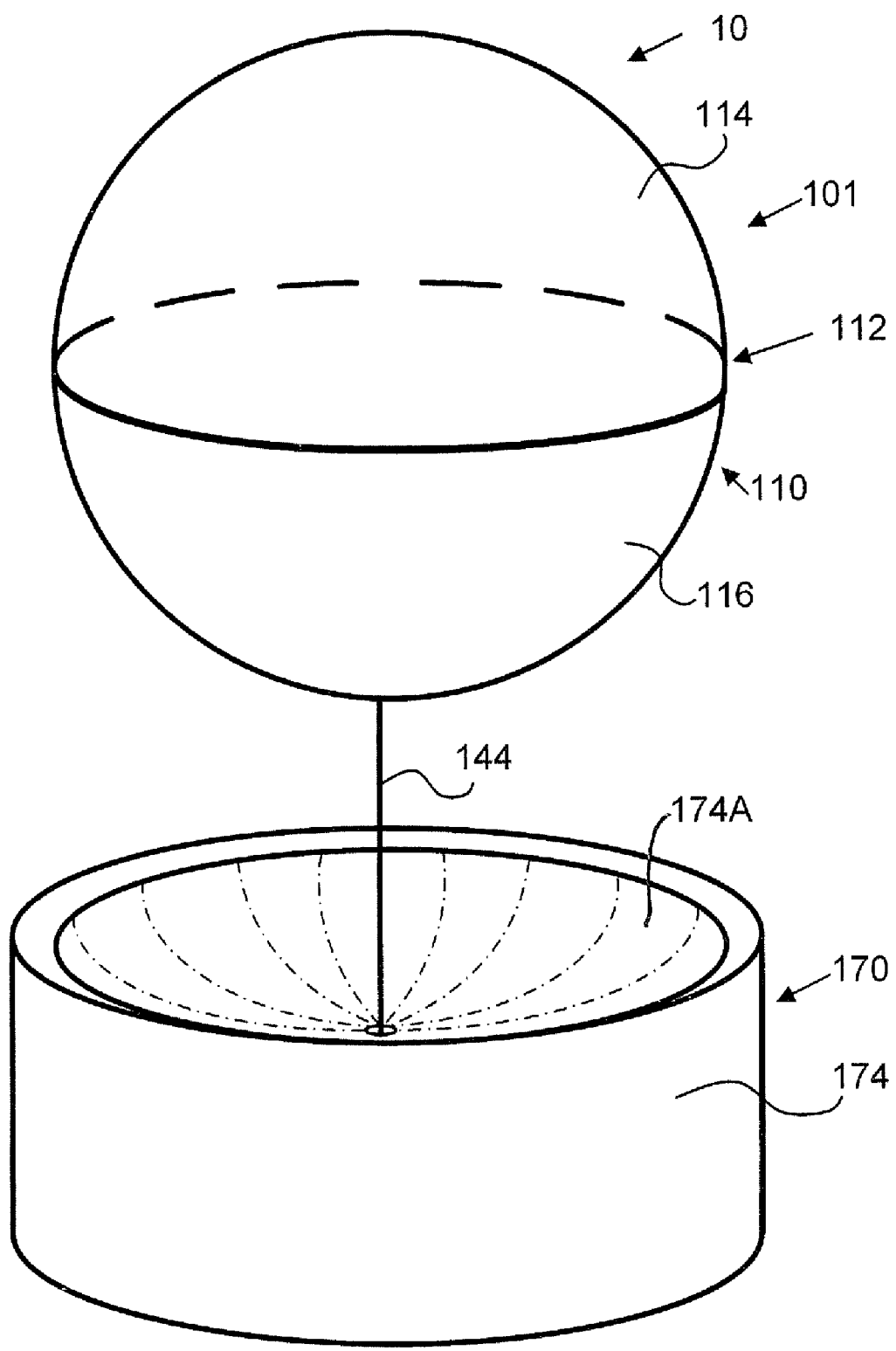
FIG. 1 is a perspective view of a payload delivery system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "dehisce" means that a component or components are separated or burst open to expose a previously enclosed chamber or volume.

With reference to FIGS. 1-5B, a payload delivery system 10 according to embodiments of the present invention is shown therein. The payload delivery system 10 includes a pressure protective container system 100 and a payload or contents 150, such as operational contents. The container system 100 includes a container assembly or container 110 within which the payload 150 is housed and a dehiscing system 130 operable to dehisce or open the container assembly to release the payload 150 from the container 110. The dehiscing system 130 includes a dehiscence module 132. The container system 100 may further include a secondary object 170 such as a vehicle or a secondary object associated with the container 110 and/or the dehiscing system 130. The container 110, the dehiscence module 132, and the payload 150 together constitute a dispensable unit 101 that can be dispensed or released from the secondary object 170. The payload 150 may itself comprise a self-contained subunit that can be released from the container 110.

In general, the payload delivery system 10 can be deployed in a body of water W (FIGS. 5A and 5B) such that the container 110 (and the payload 150 therein) is submerged at a depth. The container 110 protects the payload 150 from water pressure at the depth and may thereby protect the payload 150 from damage that may otherwise occur to the payload 150 due to such water pressure. The container 110 may also protect the payload 150 from exposure to the water W at other than a desirable time or depth. Responsive to a prescribed event and/or a prescribed environmental condition, the dehiscing system 130 automatically dehisces the container 110 to thereby release the payload 150 from the container 110. The dehiscing system 130 may spontaneously open the container 110. The payload delivery system 10 can thus provide pressure protection for the payload 150 while also providing exposure of the payload 150 to the water at a desirable depth.

For example, in some embodiments, the container 110 protects the payload 150 while at a first, relatively deeper depth and is forcibly or passively caused to open by the dehiscing system 130 when the container 110 rises to a second, relatively shallower depth. According to some embodiments, the payload delivery system 10 also automatically activates a device or function of the payload 150 before or as the payload 150 is released from the container 110. According to some embodiments, the container 110 is dehisced responsive to a prescribed event including at least one of elapse of a prescribed period of time, achievement or attainment of a prescribed depth, detection of a prescribed signal, receipt of a command, attainment of a prescribed location, and occurrence of a prescribed operational condition. According to some embodiments, the container 110 is dehisced when an externally imposed pressure on the container 110 (e.g., water pressure) becomes less than a prescribed threshold pressure. These and further aspects of the system 10 will now be described in further detail.

Figures 5A, 5B:
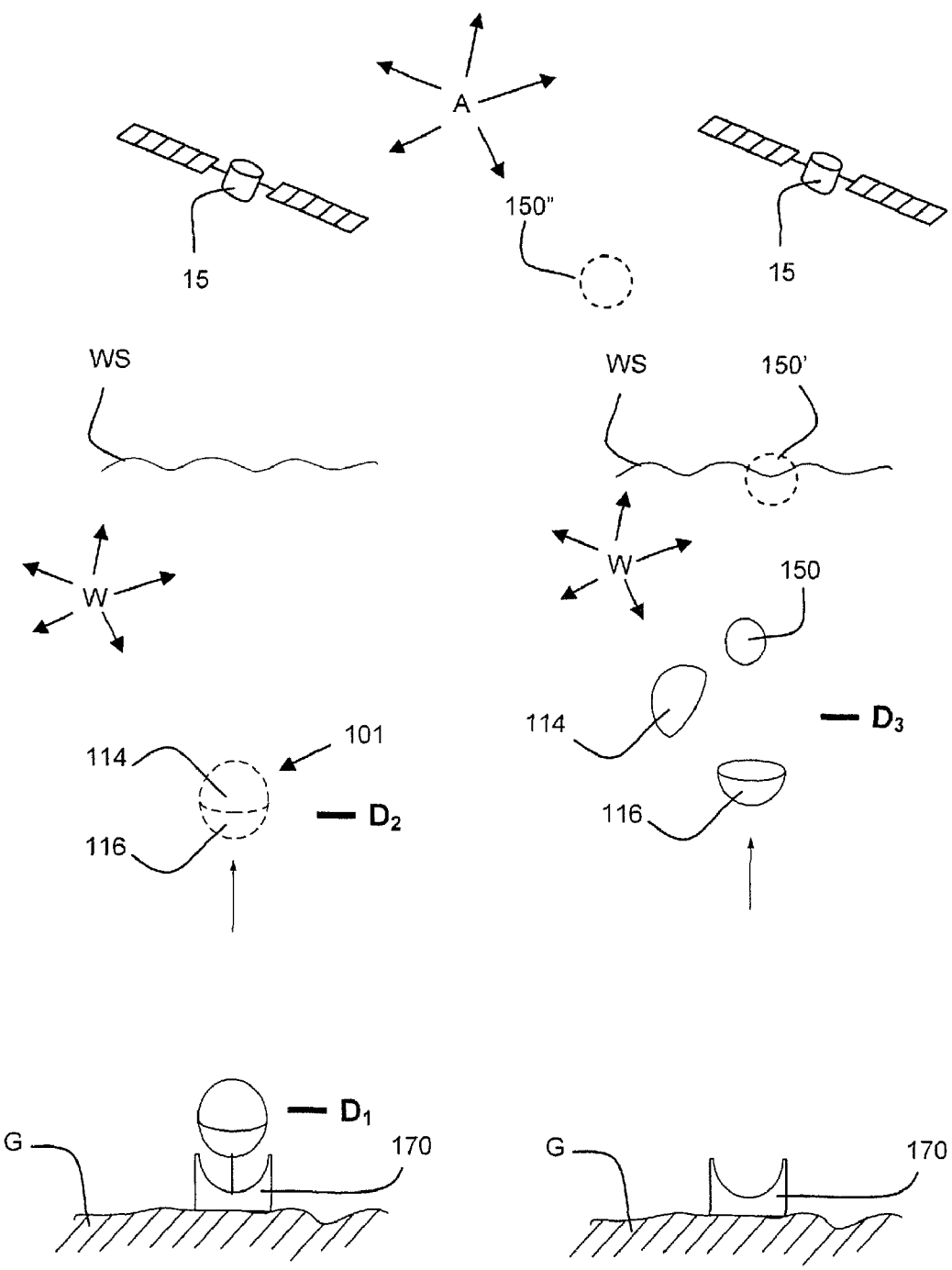
FIG. 5A is a schematic view of the payload delivery system of FIG. 1 wherein the dispensable unit is depicted at first and second depths in a body of water and not dehisced.
FIG. 5B is a schematic view of the payload delivery system of FIG. 1 wherein the dispensable unit is at a third depth in the water, the container is dehisced, and the payload is released into the water.

In some embodiments, the payload 150 is a communications device adapted or configured to communicate by sending signals to and/or by receiving signals from a remote device 15 (e.g., a satellite; FIGS. 5A and 5B) from a location proximate or on the surface WS of the water W (as indicated in FIG. 5B by the numeral 150') or from a location in the air A above the surface of the water (as indicated in FIG. 5B by the numeral 150"). Systems and methods of the present invention may be used for communications between a submerged object or location and a remote user. In some cases, the payload 150 is also configured as a sensing device for environmental, oceanographic, intelligence, surveillance, or reconnaissance uses, which sensing is conducted in air A or water W. In some embodiments, the payload 150 includes a communications device as disclosed in U.S. patent application Ser. No. 11/494,941 (published as U.S. Published Application No. 2008/0192576 A1), the disclosure of which is incorporated herein by reference.

Figure 2:
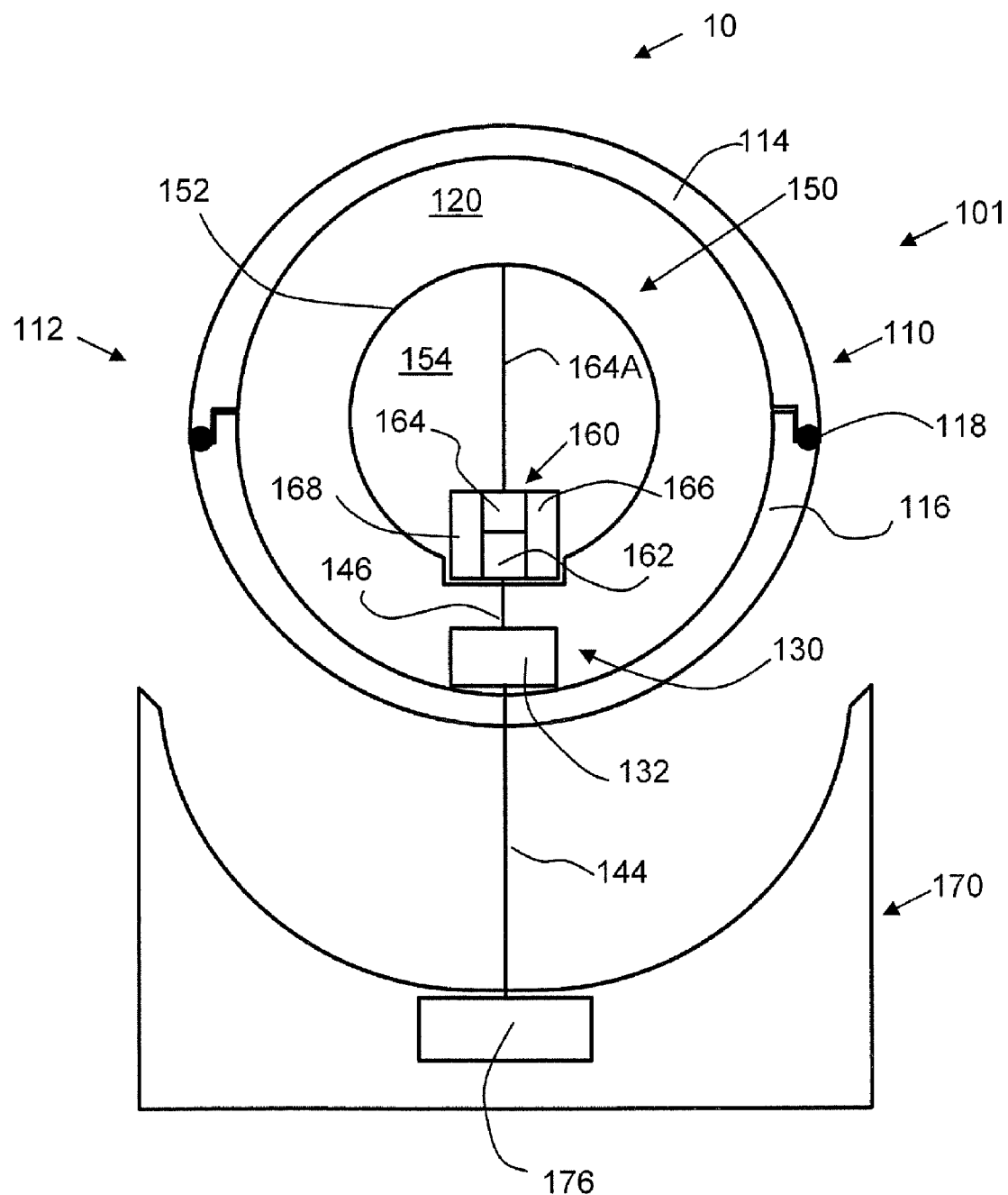
FIG. 2 is schematic, cross-sectional view of the payload delivery system of FIG. 1.
Figure 4:
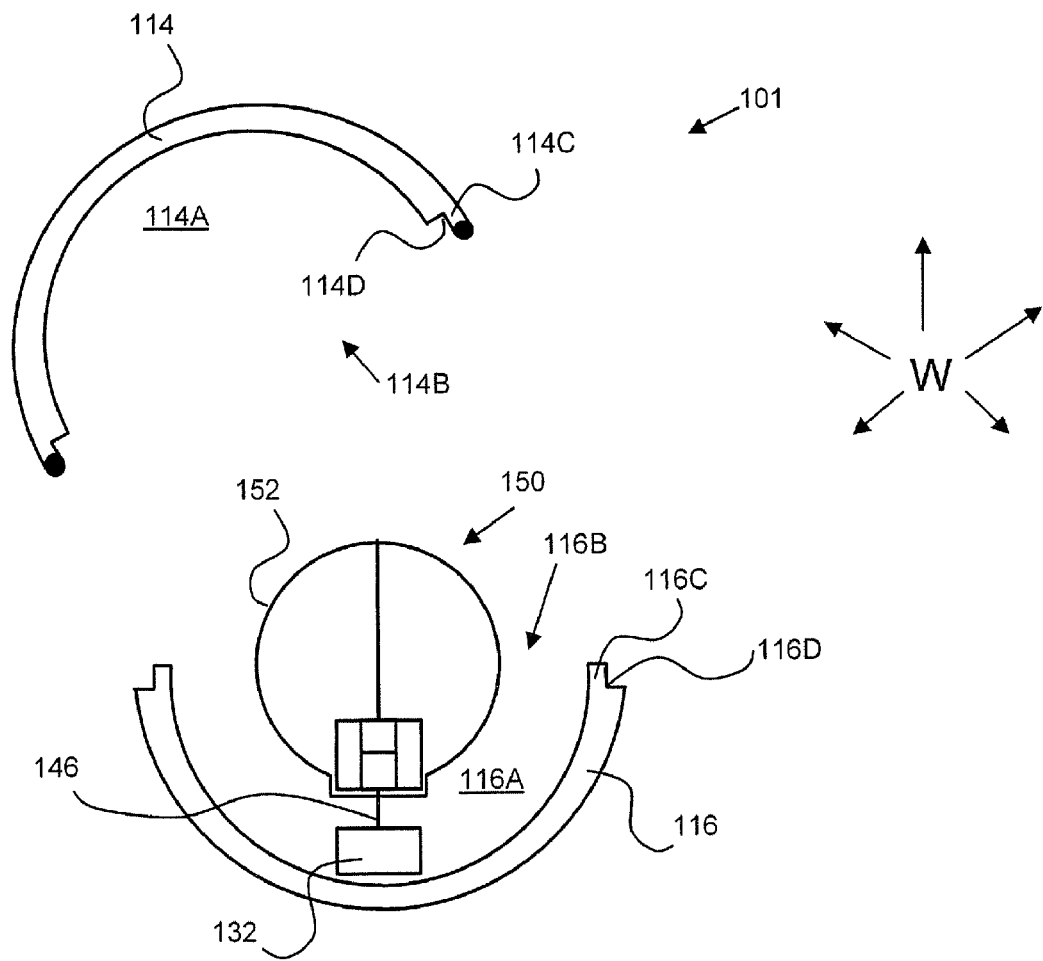
FIG. 4 is a schematic, cross-sectional view of a dispensable unit of the payload delivery system of FIG. 1 wherein a container thereof has been dehisced to expose a payload.

With reference to FIGS. 1, 2 and 4, the container 110 includes a shell 112. The shell 112 includes two or more substantially rigid shell members 114, 116. The shell members 114, 116 each have a respective perimeter face 114C, 116C (FIG. 4) defining an opening 114B, 116B (FIG. 4) communicating with a respective cavity 114A, 116A (FIG. 4). Perimeter grooves 114D and 116D (FIG. 4) are located in the faces 114C and 116C, which may serve as alignment features. The shell members 114, 116 are mated such that their perimeter faces 114C and 116C juxtapose or overlap and seat in the corresponding grooves 116D and 114D to form a face or, as illustrated, a lap joint. A seal member 118 such as an adhesive or compliant member (e.g., an elastomeric O-ring) may be interposed between the mating portions of the shell members 114, 116 to effect an improved water-resistant seal.

The shell members 114, 116 together define an interior containment chamber 120 of the shell 112. According to some embodiments, the payload 150 is substantially fully contained in the chamber 120. According to some embodiments, the shell 112 is water submersible so that water is prevented from contacting the payload 150 (or water-sensitive components thereof).

The shell 112 may be of any suitable size and shape. In some embodiments, the shell 112 is substantially spherical as shown and the shell members 114, 116 are hemispherical. According to some embodiments, the chamber 120 has a size in the range of from about 4 to 50 centimeters in diameter, which for a spherical shape corresponds to a volume in the range of from about 0.03 to 6.5 liters.

The shell 112 may be formed of any suitable material. According to some embodiments, the shell 112 is formed of a polymeric material such as Plexiglass, polycarbonate, glass or glass-filled polymer.

The shell 112 may have any suitable size and volume. In some embodiments, the volume of the shell 112 and the volume of the chamber 120 are selected to provide a desired buoyancy to thereby provide a desired rate of change in depth when permitted to float freely. The shell 112 may be sized so that it can rise buoyantly at a desirable rate from a deployment depth to a desirable release depth, such as one at which the payload is not damaged by water pressure and can be released.

Figure 3:
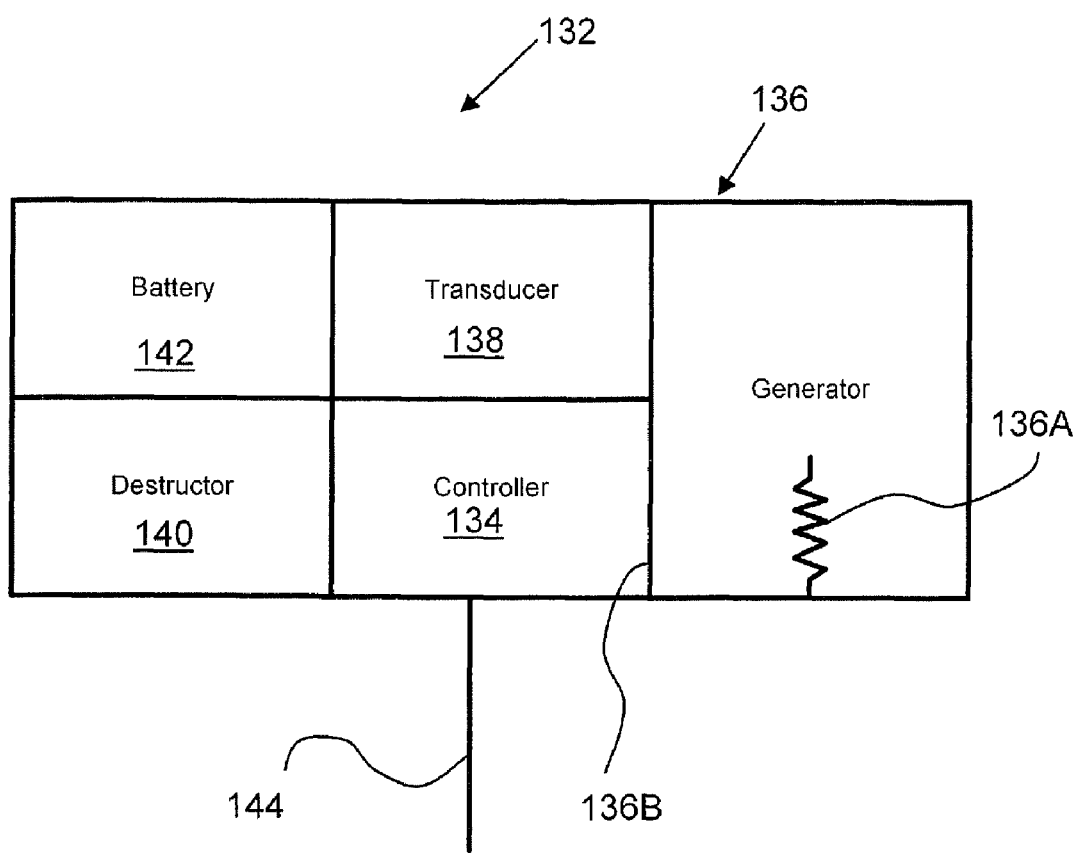
FIG. 3 is a schematic view of a dehiscence module of the payload delivery system of FIG. 1.

The dehiscing system 130 can operate using any suitable principle or mechanism to dehisce the shell 112 to release the payload 150. According to some embodiments, the dehiscing system 130 opens the shell 112 by generating an outward force or pressure. An exemplary dehiscing system 130 as illustrated in FIG. 3 includes a dehiscence module 132 and a link 144 between the dehiscence module 132 and the secondary object 170. The dehiscence module 132 includes a controller 134, a pressure generator 136, a transducer 138, a destructor 140, a battery 142, a link 144 (to the secondary object 170), and a link 146 (to the payload 150).

According to some embodiments, the dehiscing system 130 can provide an internal pressure acting outward against the shell 112 in the range of from about 0.001 to 100 atmospheres (gauge), corresponding to a range of depth in water of from about 1 cm to 1000 meters or more.

The controller 134 may be any suitable device or devices configured to enable the methods discussed herein. The controller 134 can be configured to provide operational control, to store signals, and/or to provide signals. The controller 134 may include a microprocessor. The controller 134 may execute, initiate and/or coordinate dehiscence of the shell 112, sensing of an event or parameter (e.g., an environmental condition), processing of sensed or received data, and/or communication with an external device. In some embodiments, the controller 134 is responsive to a processing result and/or a state of the shell 112 to initiate dehiscence of the shell 112.

The pressure generator 136 may be any suitable device capable of providing an increase in the internal pressure in the chamber 120 sufficient to dehisce the container 110. According to some embodiments, the pressure generator generates additional internal pressure in the chamber 120 by heating the volume of gas therein. According to some embodiments, the heated gas in the chamber is a fixed amount of gas.

According to some embodiments, the pressure generator 136 is a gas provider that can provide additional gas to the chamber 120 to increase the pressure in the chamber 120. The gas provider may provide additional gas by releasing a gas (e.g., compressed gas from a container), oxidizing a material (e.g., by igniting), volatilizing to cause release of a volatile gas (e.g., by heating a petrochemical or a carbonate material), and/or generating a gas by chemical reaction.

In some embodiments, the pressure generator 136 is a gas generator including a heating element 136A coated with or placed proximate a gas providing material such as potassium permanganate powder. Potassium permanganate is known to react chemically in the presence of heat to release oxygen gas. In some cases, the heating element 136A is disposed in a housing 136B that separates the heating element 136A from portions of the shell 112 and/or the payload 150 that might otherwise be adversely affected by heat. The housing 136B permits the flow of gas through the housing 136B.

Other suitable gas generators for the pressure generator 136 include a gas generator that contains a chemically reactive substance (e.g., an acid, base, salt or water) with a reactive metal, salt, mixture, composition or solution. For example, gas may be provided by mixing a metal such as lithium or a salt such as lithium hydride with water to generate a gas (e.g., hydrogen).

The transducer 138 may include any suitable device or devices to support desired operations of the payload 150. According to some embodiments, the transducer 138 includes a radio or other wireless communication device that can send and/or receive a signal. The received and/or transmitted signals may include data such as a command, program, or update. In some embodiments, the transducer 138 employs a physical connection in place of or additional to a wireless connection.

The transducer 138 may include a transmitter. Examples of suitable transmitters include a radio antenna circuit, an optical source, or a sonar transponder. The transmitter may include an acoustic detector, an acoustic emitter, an optical sensor, an optical emitter, an electromagnetic wave sensor, and/or an electromagnetic wave emitter.

In some cases, the transducer 138 includes a sensor. According to some embodiments, the sensor is adapted to sense a parameter of the container system 100 itself, a parameter external to the container system 100, or an exogenous signal. According to some embodiments, the sensor is adapted to sense a parameter of the water W. According to some embodiments, the sensor includes an acoustic detector, an RF detector, a hydrophone, an optical detector, a camera, and/or an environmental sensor. Detected or transmitted signals may include, for example, radio, magnetic, electric, electromagnetic, mechanical, chemical, optical, and/or environmental signals.

The secondary object 170 (FIGS. 1 and 2) may be an object or structure of any suitable configuration external to the shell 112 that provides a complementary attribute or service to the dispensable unit 101. The secondary object 170 may provide weight to anchor or reduce the buoyancy of the dispensable unit 101. The secondary object 170 may be operable to control, communicate with or signal to or via the dispensable unit 101. According to some embodiments, the secondary object 170 includes a housing 174 defining a seat 174A for the shell 112. An external controller 176 of the secondary object 170 can be operatively connected to the dehiscence module 132 by the link 144. The dehiscence module 132 and the external controller 176 can transmit force, energy and/or signals therebetween via the link 144. In some embodiments, the link 144 is a physical link and the dehiscence module 132 and/or the secondary object include a mechanism to selectively release or sever the link 144. In some embodiments, the link 144 is a wireless radio or magnetic link, e.g., for communications.

The payload 150 (FIG. 2) may be of any suitable type and configuration that is desirably stowed, conveyed or deployed with respect to a submerged location or desirable deployment depth. As discussed above, the payload 150 may in some embodiments include a self-contained unit and, more particularly, may include a self-contained communications device. In some embodiments and as shown in FIG. 2, the payload 150 includes a skin or housing 152 defining an interior chamber 154 and an operational module 160 contained in the chamber 154. The operational module 160 can include a controller 162, a transducer 164, a destructor 166 and a battery 168.

The housing 152 may be of any suitable type capable of providing protection for the contents of the chamber 154 from exposure to water. According to some embodiments, the housing 152 is a flexible skin formed from a plastic or elastic material or film.

The controller 162 may be any suitable device or devices configured to enable the methods discussed herein. The controller 162 may be configured to control, activate, energize, modify or destruct the shell 112, the dehiscing system 130, the link 146, the housing 152, the transducer 164, the destructor 166 and/or the battery 168. The controller 162 may include a processor configured to accept and process a signal such as a command, communication, trigger, alarm, activation or initiation. According to some embodiments, the controller 162 is operatively connected to the dehiscence module 132 by the link 146 to transmit signals therebetween.

The transducer 164 may be connected to the controller 162 and can be configured to send and/or receive a signal. The transducer 164 may include a radio and an associated antenna 164A. The transducer 164 may be configured to modify a signal and may include a conditioner, converter and/or processor for this purpose. The transducer 164 may be capable of sending and/or receiving at least one of an electrical, optical, magnetic, inductive, radio frequency, thermal and mechanical signal.

The destructor 166 is configured to, when activated, render at least a portion of the payload 150 inoperable. In some embodiments, the destructor 166 can be activated to rend or breach the housing 152. In some embodiments, the destructor 166 can be activated to overload the circuits of or destroy the controller 162 and/or the transducer 164.

The battery 168 may be connected to provide power to one or more of the dehiscence module 132, the link 146, the payload housing 152, the controller 162, the transducer 164, and the destructor 166.

The payload delivery system 10 may be constructed by any suitable means. The payload 150 and the dehiscence module 132 are positioned in the shell members 114, 116 and a suitable seal is effected between the shell members 114, 116.

In some cases, payload 150 is sealed in the shell 112 with excess or injected gas, for example at the time of final assembly, to provide an internal pressure greater than zero atmospheres (gauge). In some cases, the shell 112 is assembled at a reduced environmental temperature as means of producing elevated internal pressure in use. For example, the shell 112 can be assembled and sealed while inside an assembly apparatus operated at between 0 and 20 atmospheres (gauge). In use, the increased internal pressure can cause or assist in separation of the shell members 114, 116 to dehisce the container 110. In some embodiments, the pressure generator 136 can be omitted or remain unactivated, and the container 110 is dehisced by the elevated positive pressure in the chamber 120 when said chamber pressure exceeds the external pressure imposed by the water W and the resistance to dehiscing presented by the seal.

In some cases, the payload 150 is sealed in the shell 112 at a reduced atmospheric pressure or an elevated environmental temperature as means of producing reduced or sub-atmospheric internal pressure in use. In use, the reduced internal pressure can prevent or inhibit separation of the shell members 114, 116 until actuation of the dehiscing system 130 to dehisce the container 110.

The payload delivery system 10 can be used to contain and protect the payload 150 in the chamber 120 until a desired or prescribed event or condition occurs, whereupon the dehiscing system 130 will cause the shell members 114, 116 to dehisce and release the payload 150 from the chamber 120. In this manner, the payload 150 can be protected from the surrounding fluid, temperature, pressure, harmful signals or other environmental conditions that may damage or compromise the payload 150. The dehiscing system 130 may cause the container 110 to dehisce using a suitable actuator automatically in response to the desired or prescribed event or condition.

The prescribed event or condition that triggers the dehiscing system 130 to initiate dehiscence of the container 110 may depend on the nature of the deployment, the nature and characteristics of the payload 150, the intended operations, and other structural and operational factors and attributes. According to some embodiments, the container 110 is dehisced responsive to a prescribed event including at least one of elapse of a prescribed period of time, achievement or attainment of a prescribed depth, detection of a prescribed signal, receipt of a command, attainment of a prescribed location, and occurrence of a prescribed operational condition. According to some embodiments, the container 110 is dehisced when an externally imposed pressure on the container 110 (e.g., water pressure) becomes less that a prescribed threshold pressure.

The container 110 may be dehisced by the dehiscing system 130 using any suitable mechanism to generate an outward force capable of dehiscing the container 110. In some embodiments, this outward force may be generated mechanically or electrically, for example, by melting, as discussed below with regard to further embodiments of the present invention. In some embodiments, the outward force is provided by generating increased gas pressure within the chamber 120 with respect to external pressure that forces the shell members 114, 116 apart. The increased gas pressure can be generated by heating an existing gas in the chamber 120 and/or generating additional gas as discussed above (e.g., with reference to the pressure generator 136). In embodiments wherein the container 110 is manufactured to have an internal pressure that is negative (i.e., sub-atmospheric), the dehiscing system 130 may generate sufficient additional internal pressure to both offset or compensate for the negative initial internal pressure and to exceed the external pressure at the selected depth in an amount sufficient to overcome the seal between the shell members 114, 116. In embodiments wherein the container 110 is manufactured to have an internal pressure that is positive (i.e., greater than atmospheric), the requirement for additional pressure may be reduced by a corresponding amount.

The payload delivery system 10 may be initially deployed in any suitable location and manner. For example, the payload delivery system 10 may be mounted on a vehicle (e.g., an unmanned underwater vehicle (UUV)), a platform, or the substratum G, or may float neutrally buoyantly between the substratum G and the surface WS of the water. Once deployed, the payload delivery system 10 may hold the dispensable unit 101 (i.e., the container 120, the dehiscence module 130, and the payload 150) and subsequently release the dispensable unit 101 from the secondary object 170 responsive to the occurrence of a prescribed event, time or environmental condition. According to some embodiments, the dispensable unit 101 is automatically released from the secondary object 170 responsive to the triggering event or condition. According to some embodiments, the dispensable unit 101 is released responsive to a prescribed event including at least one of elapse of a prescribed period of time, achievement or attainment of a prescribed depth, detection of a prescribed signal, receipt of a command, attainment of a prescribed location, and occurrence of a prescribed operational condition. Once released, the dispensable unit 101 will buoyantly ascend in the water W.

The dehiscence module 132 may initiate the generation of increased internal pressure or such other step(s) as needed to dehisce the container 110 before, during or after release of the dispensable unit 101 from the secondary object 170. The dehiscence module 132 may be triggered to initiate dehiscence by the same triggering event or condition that triggers the release of the dispensable unit 101, or may be triggered by a different event/condition. For example, the dehiscence module 130 may cause the container 110 to dehisce a prescribed number of seconds after release from the secondary object 170. By way of further example, the dehiscence module 130 may cause the container 110 to dehisce when the external pressure becomes less than a prescribed threshold pressure. By way of further example, the dehiscence module 132 may cause the container 110 to dehisce only when the dispensable unit 101 receives a command, such as by wireless signal from a remote device (e.g., the device 15 of FIG. 5B).

An exemplary deployment and use of the payload delivery system 10 in accordance with embodiments of the present invention will now be described with reference to FIGS. 5A and 5B. The payload delivery system 10 is placed on the substratum G, thereby positioning the dispensable unit 101 at a first, relatively deep depth $D_1$ as shown in FIG. 5A. As such, the dispensable unit 10 is subjected to a relatively high water pressure from which the payload 150 is protected by the container 110. The dispensable unit 101 may remain in this position for some definite or indefinite period of time. During this time, the controllers 134, 162, 176, transducers 138, 164 or other components of the secondary object 170, the dehiscing system 130 and/or the payload 150 may monitor the environment, await commands or signals, process received or acquired data, or the like.

The dispensable unit 101 is thereafter released from the secondary object 170. This may be accomplished by severing or otherwise ceasing the link 144 or otherwise decoupling the container 110 from the secondary object 170. The release of the dispensable unit 101 from the secondary object may be triggered by an event or condition as discussed above. For example, the external controller 176 of the secondary object 170 or the controller 134 may be commanded to sever the link 144 by transmitting a wireless signal thereto or by altering a magnetic field with respect to a magnetic reed switch. Once released, the dispensable unit 101 then buoyantly rises due to its own net buoyancy as shown in FIG. 5A in dashed lines to a second depth $D_2$ and beyond.

The dispensable unit 101 may continue to buoyantly rise to lesser depths (e.g., a shallower depth $D_2$ as indicated in FIG. 5A) without yet being dehisced. After the dispensable unit 101 has risen to a third, relatively shallower depth $D_3$, the dehiscence module 132 dehisces the container 110 to expose the contents of the chamber 120 and thereby release the payload 150 from the shell 112 as shown in FIGS. 4 and 5B. The dehiscence of the container 110 may be triggered by any suitable and desired event or condition such as described above. As illustrated, the third depth $D_3$ is located below the water surface WS. However, dehiscence may be delayed until the dispensable unit 101 is at the water surface WS or above the water surface (e.g., floating in the air A).

In order to support initiation, coordination and/or execution of the steps of releasing the dispensable unit 101 and dehiscing the container 110, the external controller 176, the payload controller 162, and/or the dehiscence module controller 134 may conduct appropriate processing and sense associated parameters. According to some embodiments, one or more of these controllers determine a depth of the dispensable unit 101, determine a location of the dispensable unit 101, and/or determine an operational condition of the container 110 or the payload 150.

Deployment of the dispensable unit 101 may further include activating operation of one or more components of the payload 150 and/or the dehiscence module 132, such as the controller 134, the transducer 138, the controller 162 or transducer 164. For example, when the release and dehiscing procedure is initiated, the dehiscence module 132 may automatically activate the controller 162 or the transducer 164.

In some embodiments, the dehiscence module 132 transfers signals or the results of processing to the payload 150 for use in the operation of the payload 150.

The link 144 between the secondary object 170 and the dehiscence module 132 may be used to transmit energy, commands and/or data between the secondary object 170 and the dehiscence module 132. The link 146 between the dehiscence module 132 and the payload 150 can be used to transmit energy, commands and/or data between the dehiscence module 132 and the payload.

The payload delivery system 10 may also send an activation confirmation to an external object, such as a secondary container, dispenser, operator console, or other operational object. Such an activation confirmation may be sent by the secondary object controller 176, the dehiscence module controller 132, and/or the payload controller 162, for example. The activation confirmation may include a confirmation that the dispensable unit 101 has been released from the secondary object 170, that the container 110 has been dehisced, that the dehiscence procedure has been initiated, and/or that a component or components of the payload have been activated.

The payload delivery system 10 may also send an informational signal to an external object, such as a secondary container, dispenser, operator console, or other operational object. The informational signal may indicate the condition of the container system 100 and/or the condition or status of the payload 150.

The payload delivery system 10 may also send or receive operational signals to/from an external object, such as a secondary container, dispenser, operator console, or other operational object. Operational signals may embody, for example, relayed messages, environmental conditions, events, etc. For example, an external object can transmit to the payload 150 signals that are desirably broadcast or operational instructions that determine operation of the payload 150, such as duration and strength of transducer emission and destruction of the housing 152, controller 162 or other payload component.

In some cases, the shell members 114, 116 are scuttled, such as by sinking following release of payload 150. In some cases, a link is maintained between the payload 150 and a shell member 114, 116 or other shell component, which linked portion of the shell 112 is negatively buoyant and acts as a sea anchor to reduce motion of the payload 150 floating on the water surface WS.

Figure 6:
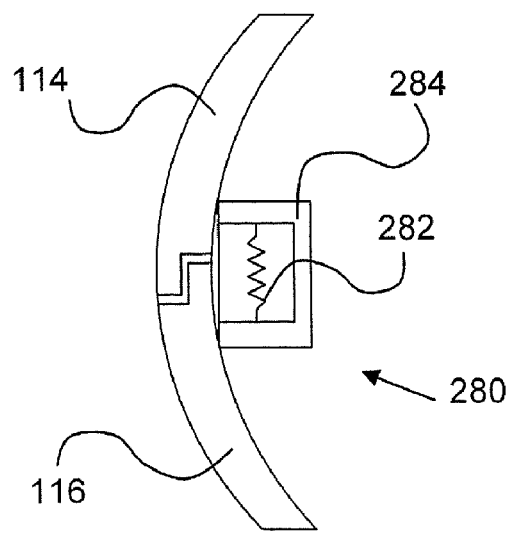
FIGS. 6-8 are schematic, fragmentary, cross-sectional views of the payload delivery system of FIG. 1 including supplemental or alternative dehiscence actuators.

In some embodiments, the seal between the shell members 114, 116 may be configured, released or actively modified to facilitate dehiscing of the container 110 and/or reliable separation of the shell members 114, 116. In some embodiments, a mechanical force actuator may be used in place of or in addition to (i.e., supplemental) a pressure generator (e.g., the pressure generator 136). For example, with reference to FIG. 6, a dehiscence actuator system 280 according to further embodiments of the present invention includes a pusher 282 in the form of a spring and a retainer 284 in the form of a wire. The retainer 284 resists decompression of the pusher 282 until the dehiscing operation is triggered, whereupon the retainer 284 is severed and thereby releases the pusher 282. The released spring 282 then mechanically urges the shell members 114, 116 apart. The dehiscing system 130 can dislodge or sever the retainer 284 in any suitable manner to release the spring 282. For example, a mechanism can be provided to displace, release, extend, elongate, sever, melt or decouple the retainer 284. The pusher 282 and the retainer 284 can be mounted on the inside or the outside of the shell 112. Other suitable retainers may include retaining magnets, a ring, a clip, a strap, or a closefitting device such as secondary container or dispenser.

Figure 7:
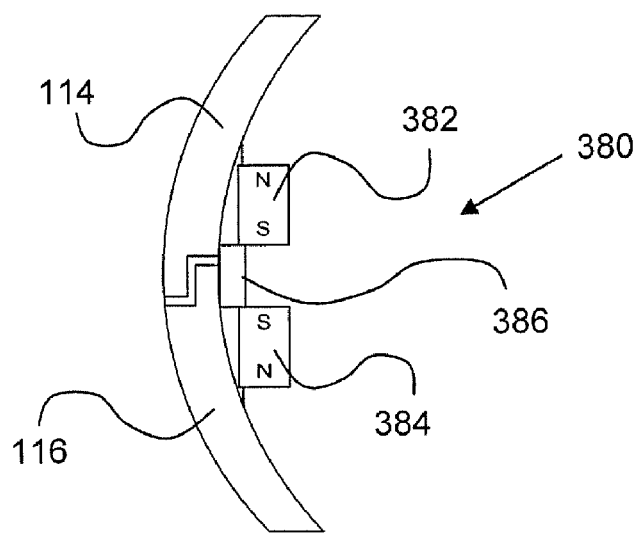

With reference to FIG. 7, a magnetic dehiscing actuator system 380 according to further embodiments of the present invention is shown therein and includes a pair of opposed magnets 382, 384 and a retainer 386. The magnets 382, 384 repel one another and cooperatively function as a pusher to exert a separation force on the shell members 114, 116. The dehiscing system 130 can dislodge or sever the retainer 386 in any suitable manner to release the magnets 382, 384 and thereby permit the magnet repulsion to force the shell members 114, 116 apart. The magnets 382, 384 can be permanent, semi-permanent, inducible and/or electromagnetic. In some cases, the retainer can be omitted.

Figure 8:
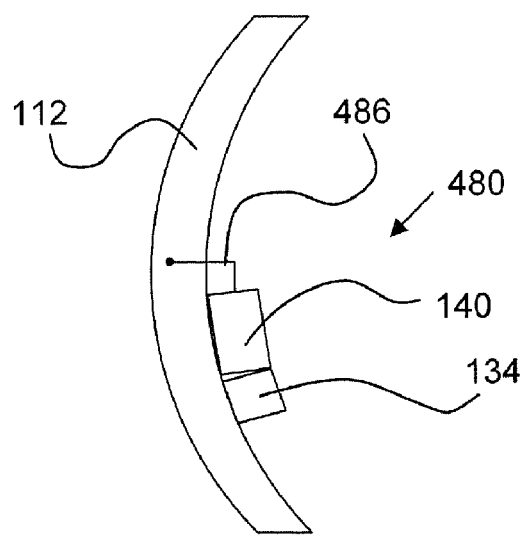

The dehiscing system may include a melter dehiscing component that can melt an opening through the shell 112. With reference to FIG. 8, a melting dehiscing actuator system 480 according to further embodiments of the present invention includes a controller (e.g., the controller 134), a destructor (e.g., the destructor 140) and a heating wire 486. A portion of the heating wire 486 is embedded in the shell 112. According to some embodiments, the shell 112 has a melting point between about 50 and 500 degrees centigrade and the heating wire 486 can generate a temperature in excess of the melting point. The heating wire 486 can be embedded in the shell 112 at the shell member interface flanges 114C, 116C, the seal member 118, and/or in a shell member 114, 116, for example.

Figure 9:
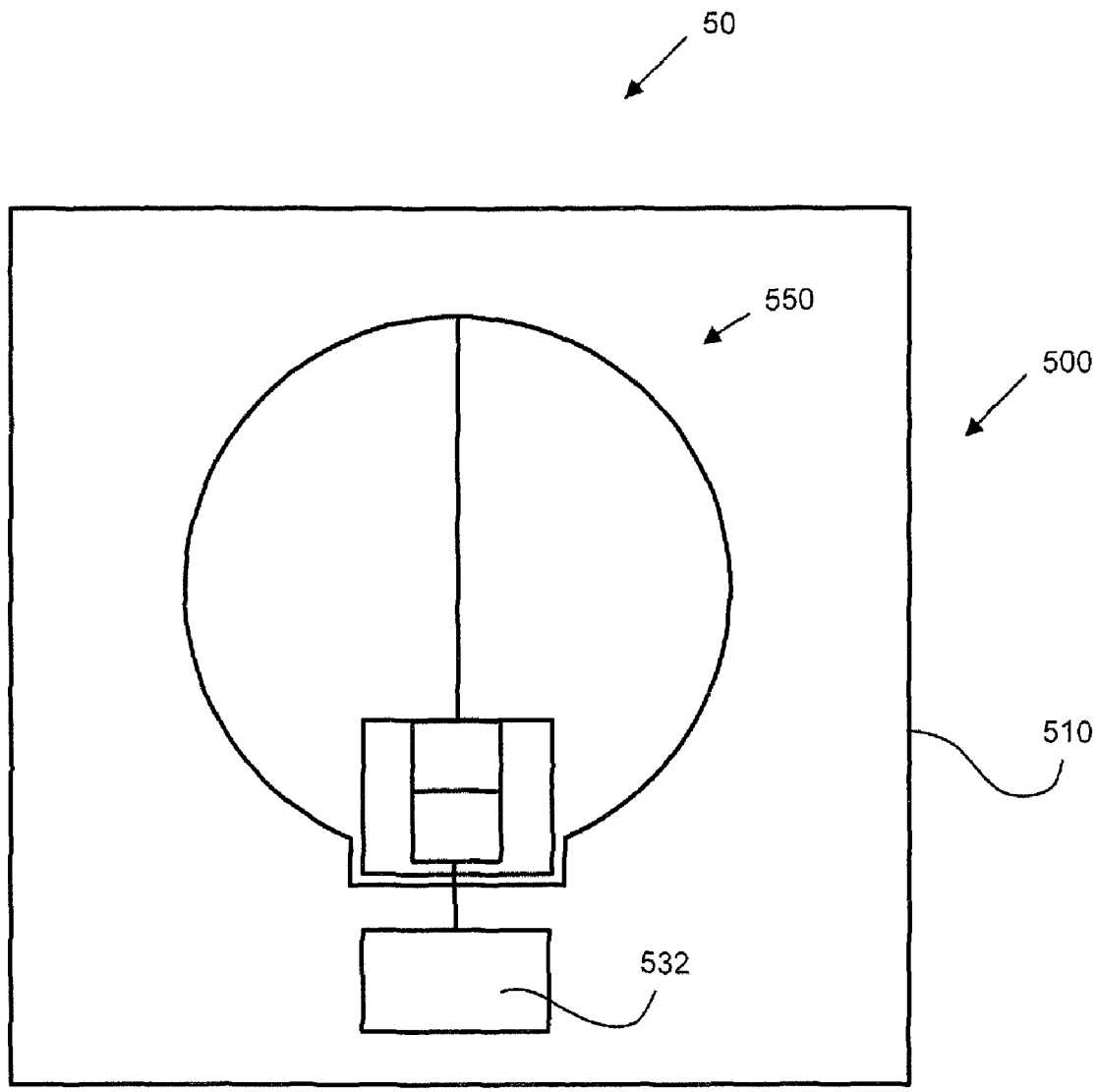
FIG. 9 is a schematic, side view of a payload delivery system according to further embodiments of the present invention.
Figure 10:
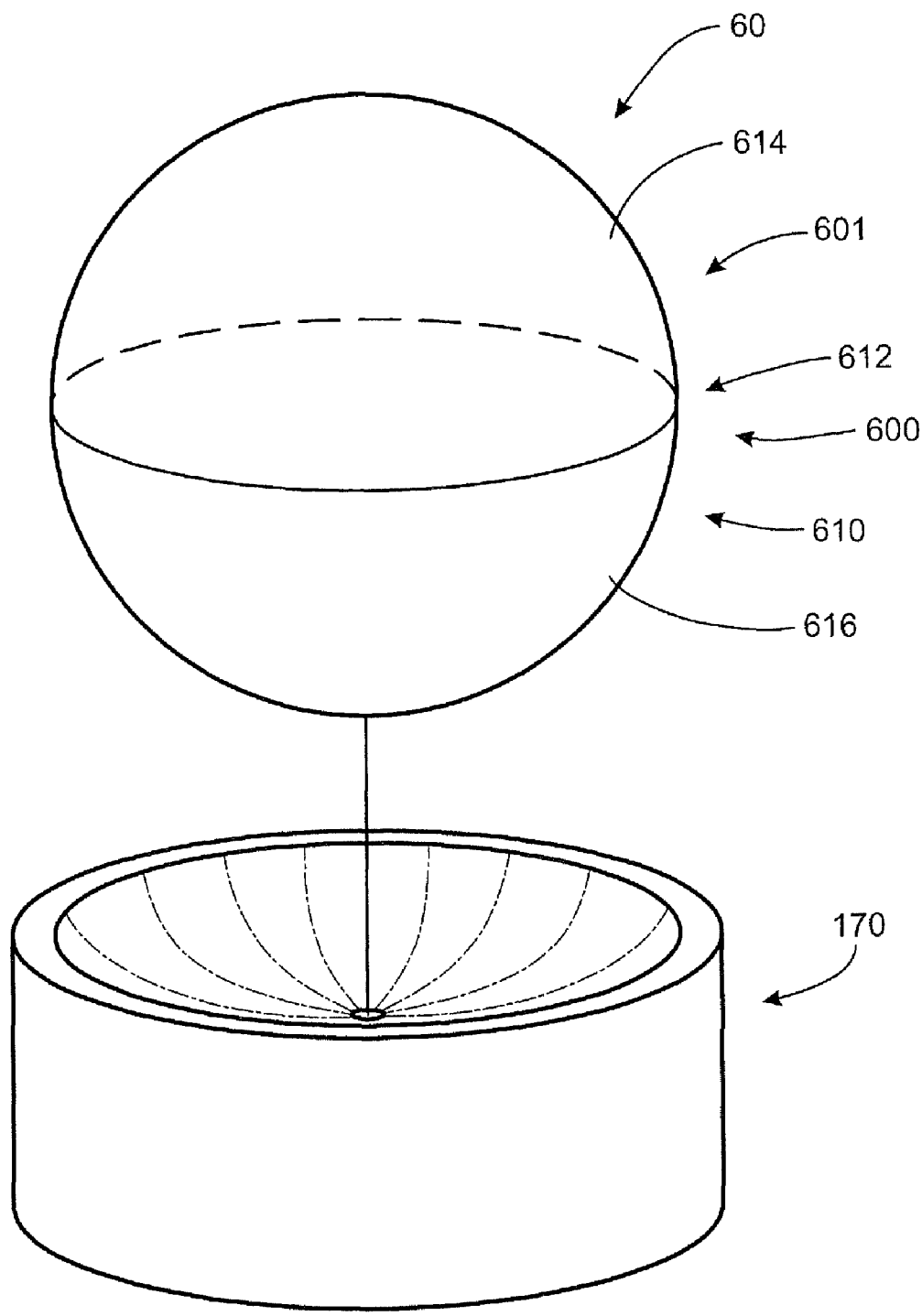
FIG. 10 is a perspective view of a payload delivery system according to further embodiments of the present invention.

With reference to FIG. 9, a payload delivery system 50 according to further embodiments of the present invention is shown therein. The payload delivery system 50 includes a container system 500 and a payload 550. The payload 550 may correspond to the payload 150, for example. The container system 50 includes a dehiscence module 532, which may correspond to the dehiscence module 532, and a compliant envelope housing 510. The housing 510 may be formed of a flexible polymeric film sealed against water to protect the payload 550. The housing 510 can be opened by the dehiscence module 532 as described above. According to some embodiments, the dehiscence module 532 includes a melter element to melt an opening in the housing 510.

As discussed above, the payload 150 may be the communications device adapted to float on the surface of the water or in the air. According to some embodiments, the payload 150 is deployed from an underwater location and passively floats to the water surface or above. From the floating location, the payload 150 sends and/or receives wireless communications signals to/from a remote device. The payload 150 may communicate with the remote device using electromagnetic, electrical, magnetic, optical, and/or acoustic signals. The payload 150 may also communicate (e.g., acoustically, optically, or magnetic inductively) with a remote device from an underwater location.

According to some embodiments, the payload 150 communicates with a remote device that is at least one of proximate the sea surface, in the air or on land using RF, optical, or acoustic signals. For example, according to some embodiments, the remote device is an apparatus or station other than the apparatus or station that deployed the payload 150, such as the remote apparatus 15 (FIG. 5B; e.g., a satellite).

The communications between the payload 150 and the remote device may be one-way or two-way. For example, according to some embodiments, the payload 150 receives signals from an underwater device and forwards these signals to a device outside of the water such as the remote apparatus 15. Alternatively or additionally, the payload 150 receives signals from a device outside of the water such as the remote apparatus 15 and forwards these signals to an underwater device. In some such embodiments, the communications between the payload 150 and the remote underwater device are accomplished via acoustic signals and the communications between the payload 150 and the remote device outside the water are accomplished via RF signals.

According to some embodiments, the payload 150 rises towards or to the surface of the water to obtain information or data that may include: environmental parameters, geo-location coordinates, command and control signals, and/or mission updates, and communicates such data to an underwater device such as a monitoring station or vehicle. In some embodiments, the payload 150 wirelessly communicates such information to the submerged device.

In some embodiments, the payload 150 sends signals to the remote device including at least one of: a signal detected from another source; a signal from another source that has been processed by the payload 150; information related to the operation or status of the payload 150 itself; an environmental parameter sensed by the payload 150; a forwarded message from another source; an identifier of the payload 150; the current time; the current date; and the location of the payload 150. The payload 150 may transmit a message containing at least one of: an identifier of the payload 150; the time a signal or parameter was detected by the payload 150; a location; a raw signal; a signature; a classification; identification; and an estimate of a range or direction to a source of a signal.

According to some embodiments, the payload 150 senses an environmental parameter and/or communicates with a remote device while the payload 150 is floating submerged in the water, proximate the water surface, or above the water surface.

In some cases, the payload 150 is released to float to the surface and emit at least one of: an acoustic, optical, or electromagnetic signal. In some embodiments, the payload 150 is interrogated or commanded by another device to emit a communications signal.

In some cases, the payload 150 operates in response to a prescribed lapse of time or arrival of a prescribed time. For example, the payload 150 may begin emitting communications signals or "wake up" to receive communications signals at a pre-programmed time. In some cases, the payload 150 operates in response to a detected signal (e.g., an interrogation or command signal).

In some cases, the payload 150 operates in response to a detected event such as a received signal or an environmental event. In an illustrative use, the payload 150 or the secondary object 170 acoustically detects a passing vessel, for example, by detecting an engine noise from the vessel. According to some embodiments, the payload 150 sends notification of the detected vessel to a remote receiver. In some cases, the notification includes additional data such as an identifier of the payload 150, a signal classification, the location where the detection occurred, and/or the time of the detection. Other environmental events that may trigger the payload 150 to communicate may include, for example, seismic activity, a tsunami, a storm, or any other event detectable by the payload 150.

According to some embodiments, the payload 150 while submerged senses an environmental parameter (e.g., a parameter of the water) and thereafter the dispensable unit 101 is released and dehisced to permit the payload 150 to float to the water surface or into the air to communicate the sensed data to a remote device.

An illustrative method of using the payload 150 includes sampling water parameters to characterize a sound velocity profile. Further methods of use may include characterizing or profiling water movement, electrical conductivity of the water, water temperature, depth in the water, light intensity, turbidity, chlorophyll concentration in the water, dissolved oxygen concentration in the water, pH of the water, or identification of a type or concentration of material in the water including at least one of: organic, inorganic, chemical, biological, radiological, and toxic material.

According to some embodiments, the payload 150 is used to aid navigation, such as by providing a signal for direction finding. In some cases, the signal comprises additional information such as location or identification information. In an illustrative example, the payload 150 is activated to emit sonar.

In some embodiments, the payload 150 is used to receive data and thereafter communicate the received data or modify its operation based on the received data.

According to some embodiments, the payload 150 is a single-use device. According to some embodiments, the payload 150 includes a scuttling system that destroys or sinks the payload 150, at least in part. For example, the payload 150 may include a hot wire, an explosive device, and/or a mechanical device that breaches the housing 152 to permit inflow of water or outflow of a lighter than air gas to cause the payload 150 to sink in the water or air. The payload 150 may include such a device or an electronic device to destroy a circuit of the payload 150.

While the container 110 has been described herein with reference to submersion in water, it will be appreciated that the container 110 may be submerged in other types of liquid and gas. The container 110 may also be submerged in sediments or other unconsolidated material.

With reference to FIGS. 10-17B, a payload delivery unit 601 according to further embodiments of the present invention is shown therein. The payload delivery unit 601 includes a container system 600 and a payload 650. The payload 650 may correspond to the payload 150, for example. The payload delivery unit 601 may be used in conjunction with a secondary object 170 as described above with reference to FIGS. 1-5B to provide a payload delivery system 60, for example.

Figure 11:
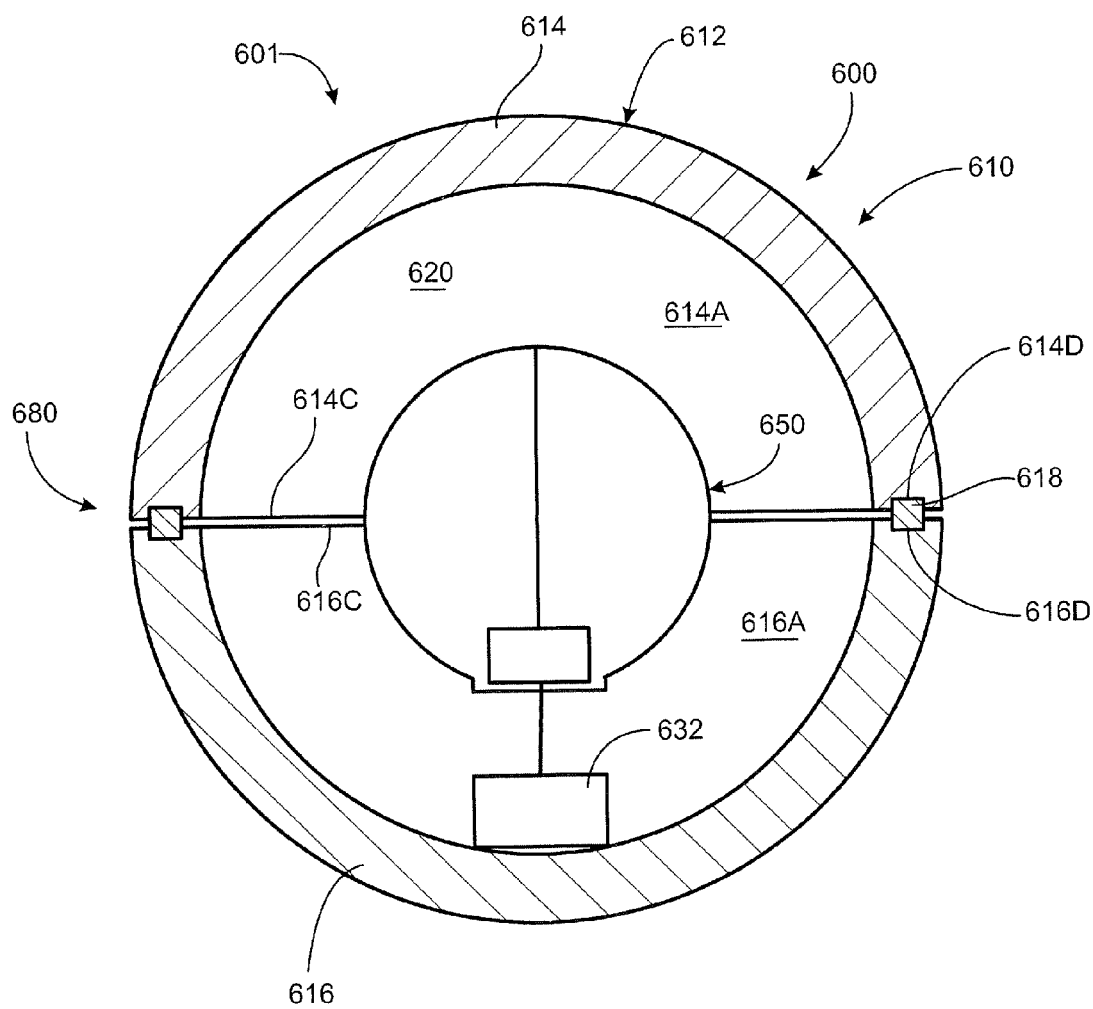
FIG. 11 is a schematic, cross-sectional view of a payload delivery unit of the payload delivery system of FIG. 10.

With reference to FIG. 11, the container system 600 includes a container 610 defining a containment chamber 620 within which the payload 650 is housed. The container system 600 further includes a dehiscence module 632, which may correspond to the dehiscence module 132, operable to dehisce the container 610.

Turning to the container 610 in more detail and with reference to FIGS. 11-15, the container includes a shell 612 and a sealing system 680. The shell 612 includes substantially rigid shell members 614, 616, which correspond to the shell members 114, 116 except as discussed below. The shell members 614, 616 each have a respective perimeter face 614C, 616C (FIGS. 11-13) defining an opening 614B, 616B (FIG. 12) communicating with a respective cavity 614A, 616A (FIG. 11). Annular perimeter grooves or channels 614D, 616D are located in the faces 614C, 616C, respectively. The shell 612 defines the interior chamber 620 and may be shaped, sized and constructed as described above with regard to the shell 112. According to some embodiments and as illustrated, the shell members 614, 616 are substantially hemispherical and the shell 612 is substantially spherical.

Figure 12:
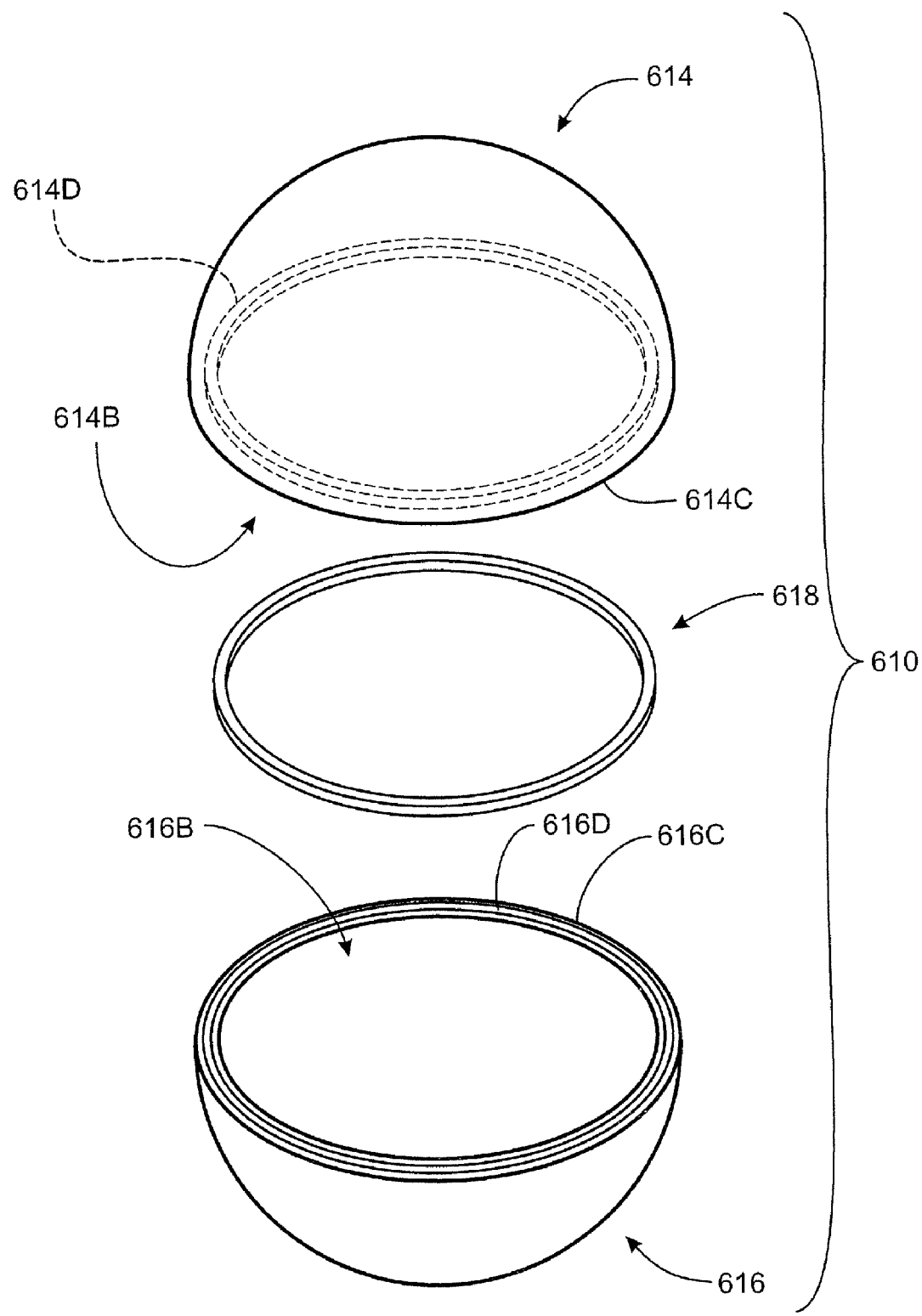
FIG. 12 is an exploded, perspective view of a shell and sealing system of the payload delivery unit of FIG. 11.
Figure 13:
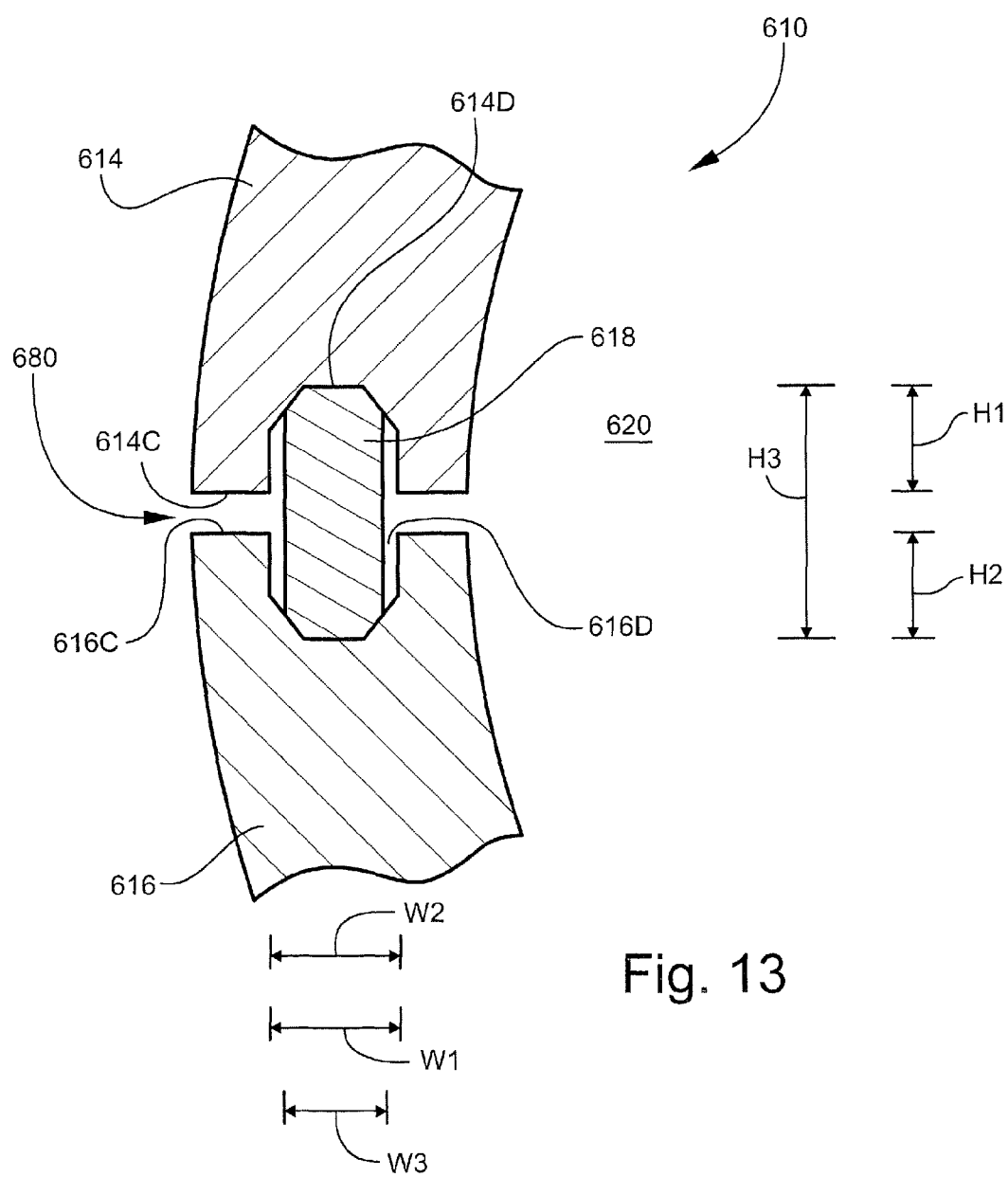
FIG. 13 is an enlarged, cross-sectional view of the payload delivery unit of FIG. 11 wherein the sealing system is in a first position.
Figure 14:
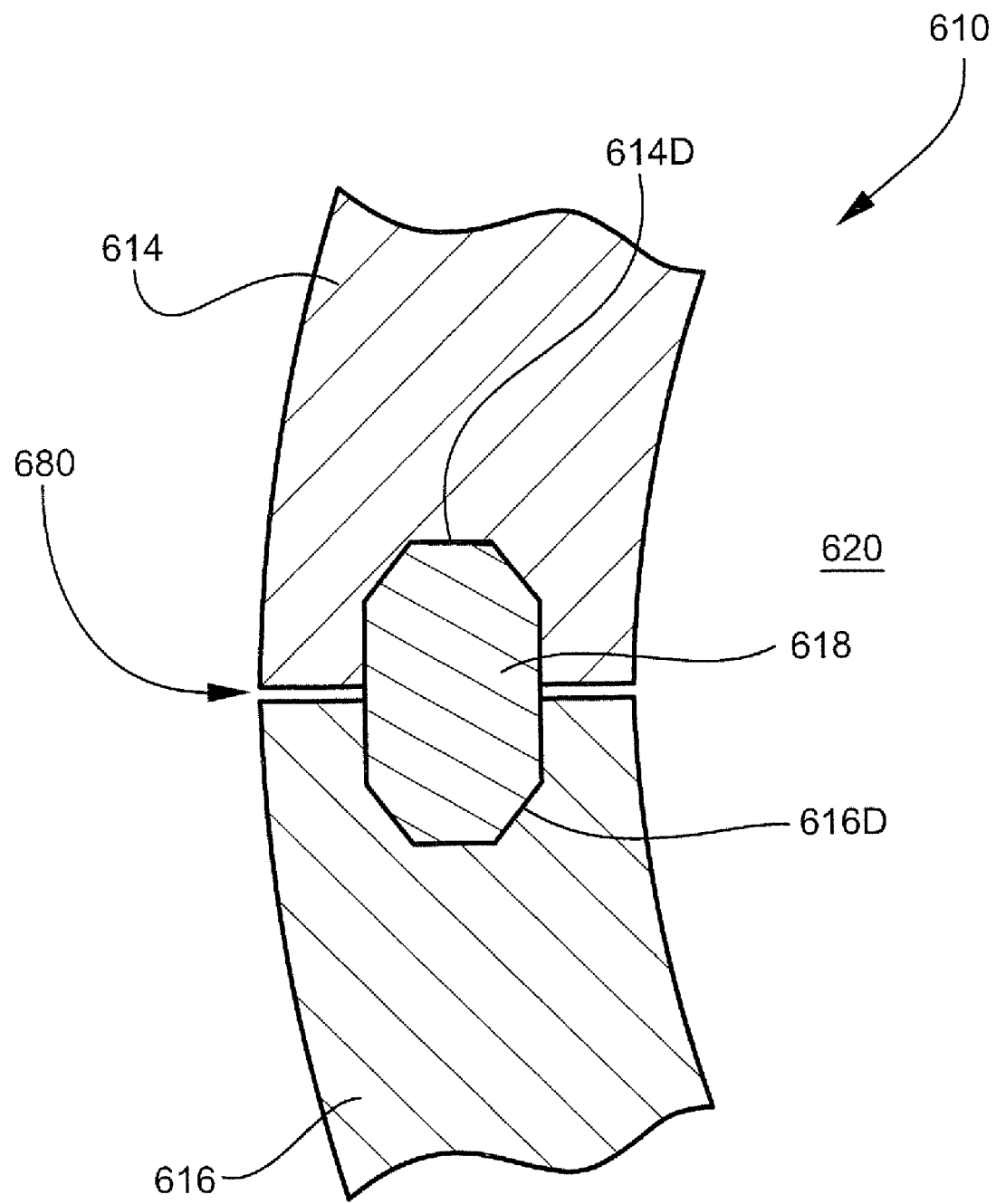
FIG. 14 is an enlarged, cross-sectional view of the payload delivery unit of FIG. 11 wherein the sealing system is in a second position.
Figure 15:
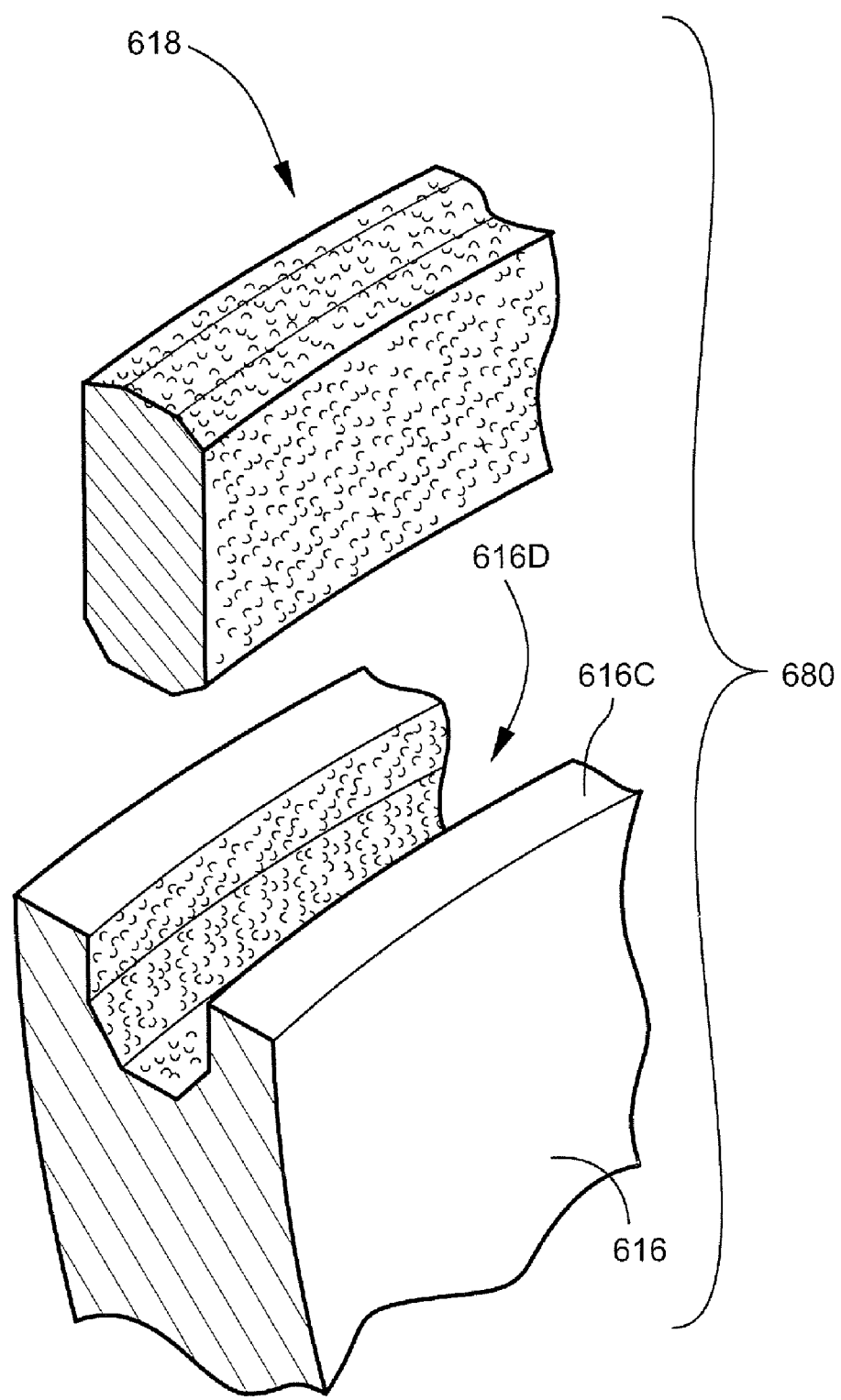
FIG. 15 is an enlarged, fragmentary, exploded view of the sealing system of FIG. 12.

The sealing system 680 includes the channels 614D, 616D and a seal device 618 (FIGS. 12-14). The seal device 618 may be an annular seal member such as an O-ring. The seal device 618 is formed of a suitable compliant, resilient, elastically deformable material. According to some embodiments, the seal device 618 is formed of an elastomeric material. According to some embodiments, the seal device 618 is formed of rubber. According to some embodiments, the seal device has a durometer in the range of from about 10 to 90 Shore A and, in some embodiments, from about 15 to 80 Shore A.

The seal device 618 is seated in each of the shell channels 614D, 616D as shown in FIG. 13 or FIG. 14, depending on the location and/or condition of the payload delivery unit 601. More particularly and as discussed in more detail below, in a first position of the shell members 614, 616, the perimeter faces 614C, 616C are spaced apart such that the seal device 618 is noncompressed or compressed to a first extent as shown in FIG. 13. In a second position of the shell members 614, 616, the perimeter faces 614C, 616C are more proximate (e.g., in abutment) such that the seal device 618 is elastically deformed or compressed to a second, greater extent as shown in FIG. 14. The seated seal device 618 may serve to properly align the shell members 614, 616 with respect to one another. According to some embodiments, the seal device 618 is retained and captured in both of the channels 614D, 616D in each of the first and second positions.

The payload delivery unit 601 and the system 60 may be deployed and used as discussed above with regard to the payload delivery unit 101 and the system 10. Additionally, the sealing system 680 of the payload delivery unit 601 is deliberately configured or tuned to enable or facilitate spontaneous opening or dehiscing of the shell 612 at a prescribed depth or in a prescribed depth range. More particularly, the container system 600 is configured and constructed such that, when the external hydrostatic pressure applied to the shell members 614, 616 by the water W exceeds the interior pressure in the containment chamber 620 (referred to herein as the "shell pressure differential") by more than a prescribed threshold pressure differential, the shell members 614, 616 will assume the first position (FIG. 14) to compressively load and deform the seal device 618 therebetween in the channels 614D, 616D. The sealing system 680 thereby effects a seal between the shell members 614, 616 (i.e., the seal device 618 sufficiently seals with each of the shell members 614, 616) that prevents ingress of the water W into the containment chamber 620 through the interface between the proximate shell perimeter faces 614C, 616C. On the other hand, when the shell pressure differential is or becomes less than the prescribed threshold pressure, the seal device 618 will elastically rebound to separate the shell members 614, 616 to the second position (FIG. 13) to thereby permit ingress of the water W into the containment channel 620 past the sealing member 618. Ingress of the water W may in turn cause the shell members 614, 616 to further or fully separate to open the shell 620.

According to some embodiments, the elastically deformed seal device 618 operates as a biasing device or spring tending to mechanically force the shell members 614, 616 apart. As a result, the seal device 618 can enable the container system 600 to dehisce at greater shell pressure differentials while nonetheless providing an adequate seal when desired.

The sealing system 680 may be tuned so that the prescribed threshold pressure corresponds to a prescribed desired opening depth. More particularly, when the payload delivery unit 601 is below the threshold depth, the sealing system 680 will prevent water intrusion and, when the payload delivery unit 601 is above the threshold depth, the sealing system 680 will permit water intrusion. However, according to some embodiments, the sealing system 680 is used cooperatively with the dehiscence module 632 to selectively control the depth at which the shell members 614, 616 are separated to permit water intrusion. The dehiscence module 632 can be activated to increase the interior pressure and thereby actively reduce the shell pressure differential. In this case, the dehiscence module 632 can serve as an active component and the sealing member 618 can serve as a passive component to force the shell 610 open at a desired time and/or depth.

Various parameters of the sealing system 680 can be selected to determine or tune the performance and trigger point (i.e., the threshold pressure differential) of the sealing system 680. These parameters may include one or more properties of the material of the seal device 618 which may include material stiffness or durometer and/or tackiness. The size and/or shape of the seal device 618 may also be selected to determine the threshold pressure differential. The shell channel materials and the dimensions and shapes of the channels 614D, 616D relative to the seal device 618 may also be selected to tune the performance of the sealing system 680 and determine the shell pressure differential at which the sealing system 680 will permit water intrusion.

The contours and locations of the seal device 618 and/or the channels 614D, 616D can determine, at least in part, the performance of the sealing system 680. According to some embodiments, the corners (in cross-section) of the channels 614D, 616D and/or the seal device 618 are rounded to more uniformly distribute stress and/or provide enhanced contact angles between the seal device 618 and the seal members 614, 616. The engaging surfaces of the seal device 618 and/or the channels 614D, 616D may be textured, polished, ridged, roughened, pitted, grooved, etched, surface relieved or otherwise treated to desirably affect seal function. For example, in FIG. 15 the seal device 618 and the channel 616D are each illustrated having surface texture to tune the seal performance. According to some embodiments, the seal device 618 is provided with an adhesive surface or coating.

According to some embodiments, the sum of the cross-sectional depths H1 and H2 (FIG. 13) of the channels 614D, 616D is less than the cross-sectional height H3 of the seal device 618 when the seal device 618 is relaxed (i.e., not compressed) and one or both of the channels 614D, 616D have a cross-sectional width W1, W2 greater than the cross-sectional width W3 of the seal device 618 when relaxed. According to some embodiments, each of the depths H1, H2 is less than half of the sealing device relaxed height H3.

As discussed above, FIG. 13 may illustrate the sealing system 680 in an opening position (wherein external water W is permitted to leak past the seal and into the interior chamber 620 under the external hydrostatic pressure) and FIG. 14 may illustrate the sealing system 680 in a sealing position (wherein external water W is prevented from leaking into the interior chamber 620). The sealing system 680 may assume a continuum of different sealing positions as the pressure differential (i.e., the external pressure less the interior pressure) changes, causing the shell members 614, 616 to move closer together or separate further. For example, as the container system 600 descends through the water W while the interior pressure is maintained substantially constant, the hydrostatic pressure may cause the faces 614C, 616C to progressively converge and further compress the seal device 618 until the faces 614C, 616C abut. The progressive compression of the seal device 618 may provide a corresponding progressive increase in the strength of the seal, thereby counteracting the increasing hydrostatic water intrusion force from the surrounding water W. Likewise, as the container system 600 ascends in the water W, the pressure on the seal device 618 is progressively relieved but the seal device 618 will nonetheless prevent water intrusion until the container system 600 assumes the opening position (FIG. 13). According to some embodiments, abutment between the faces 614C, 616C limits the maximum compression of the seal device 618.

In some embodiments, the shell 612 is assembled so as to have an interior pressure (i.e., in the chamber 620) that is less than atmospheric (gauge) at standard or ambient temperature. For example, the shell 612 may be assembled at an elevated environmental temperature or in a vacuum or a vacuum may be applied to the chamber 618. The subatmospheric interior pressure can serve to hold the shell members 614, 616 together to compress the seal device 618 for handling and/or to provide a leakage barrier seal until the container system 600 is at a depth where the hydrostatic pressure of the water W is sufficient to sealingly compress the seal device 618.

Figure 16:
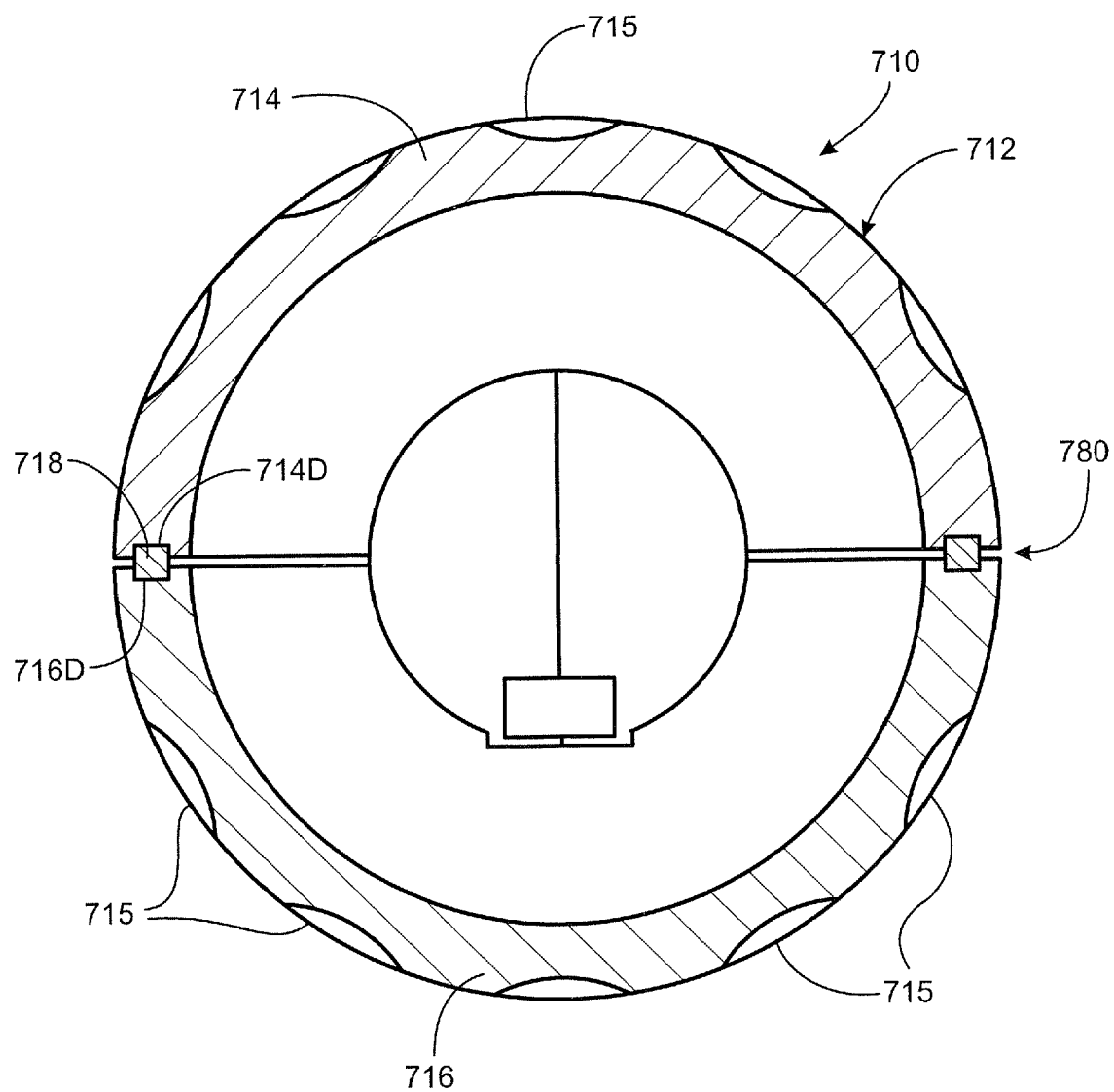
FIG. 16 is a schematic, cross-sectional view of a payload delivery unit according to further embodiments of the present invention.
Figures 17A, 17B:
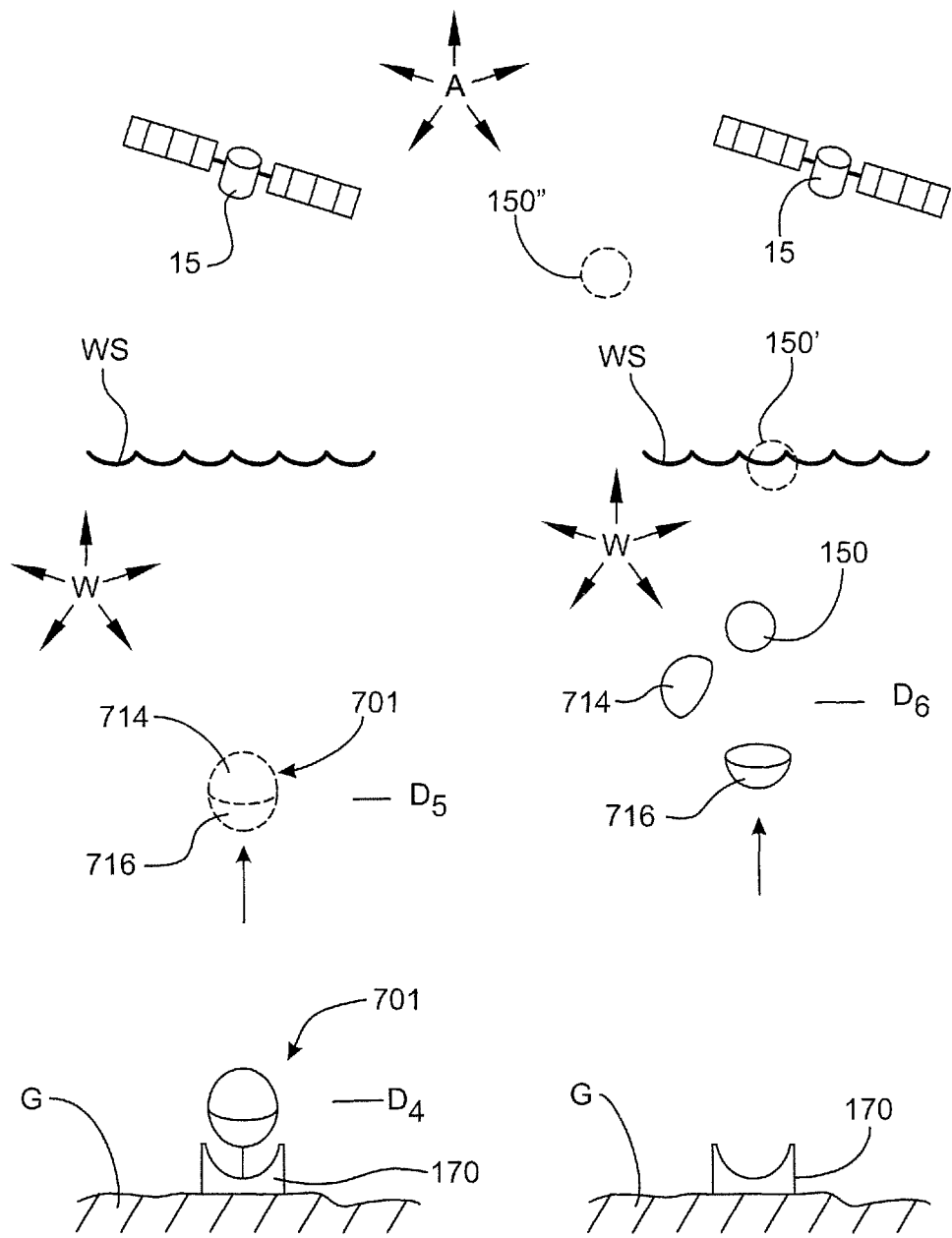
FIG. 17A is a schematic view of the payload delivery unit of FIG. 16 wherein the payload delivery unit is depicted at first and second depths in a body of water and is not opened.
FIG. 17B is a schematic view of the payload delivery unit of FIG. 16 wherein the payload delivery unit is depicted at a third depth in the water, the payload delivery unit is opened, and a payload thereof is released into the water.

With reference to FIGS. 16-17B, a payload delivery unit 701 according to further embodiments of the present invention is shown therein. The payload delivery unit 701 corresponds to the payload delivery unit 601 except that no dehiscence module is provided. The payload delivery unit 701 includes a shell 712 corresponding to the shell 612 and a sealing system 780 corresponding to the sealing system 680. The sealing system 780 includes a seal device 718 (corresponding to the seal device 618) and channels 714D, 716D in the shell members 714, 716.

The payload delivery unit 701 can be deployed and used in substantially the same manner as the payload delivery unit 601 except that a dehiscence module is not used to actively alter the pressure in the interior chamber 720. Rather, the payload delivery unit 701 operates fully passively to open the shell 712 at a prescribed opening depth.

More particularly and with reference to FIG. 17A, the payload delivery unit 701 may be placed at a first, relatively deep depth $D_4$. The payload delivery unit 701 may be secured to and released from a secondary object 170 as discussed above with reference to FIG. 5A, for example. While the payload delivery unit 701 is at the first depth $D_4$, the water pressure applied to the shell members 714, 716 will elastically deform or compress the seal device 718 to effect a seal that prevents intrusion of the water W into the chamber 720.

Once released, the payload delivery unit 701 then buoyantly rises due to its own net buoyancy as shown in dashed lines in FIG. 17A to a second depth $D_5$ and beyond. The payload delivery unit 701 will continue to buoyantly rise to lesser depths without yet opening and the hydrostatic pressure from the water W will continue to compress the seal device 718 to an extent sufficient to seal the chamber 720 against water intrusion.

As the payload delivery unit 701 rises, the external pressure lessens so that the load on the seal device 718 from the shell members 714, 716 is correspondingly progressively reduced. In response, the seal device 718 rebounds towards its original shape, causing the faces 714D, 716D to further separate. When the payload delivery unit 701 rises to or above a prescribed opening depth $D_6$ (FIG. 17B), the pressure differential between the exterior and interior of the shell 712 will be less than the prescribed threshold pressure. As a result, the seal device 718 is permitted to rebound and separate the shell faces 714D, 716D to an extent sufficient to allow the surrounding water W to leak into the chamber 720 to spontaneously open the shell 712. That is, the shell 712 spontaneously opens when the pressure differential is less than the rebound force of the seal device 718. As the chamber 720 fills with water W, the shell 712 may fully open to release the payload 150.

Selected components or properties of the payload delivery unit 701 may be tuned, selected or configured to cause the sealing system 780 to initiate automatic, spontaneous opening of the shell 712 at that prescribed opening depth. For example, the sizes, shape, material and surface characteristics of the seal device 718 and/or the channels 714D, 716D can be selected or modified as discussed above with regard to the payload delivery unit 601. The interior pressure of the chamber 720 can also be pre-set to determine the prescribed opening depth. In selecting the various parameters and configuration, the designer may factor in and accommodate environmental factors or conditions such as water temperature, which may change the interior pressure.

According to some embodiments, the prescribed opening depth $D_6$ is in the range of from about 0 to 100 meters and, according to some embodiments from about 0 to 20 meters.

The shell 712 may include features on its exterior aspect that modify drag on the shell 712 as it moves through the water W. For example, the exterior surface of the shell 712 can include dimples 715 (as shown in FIG. 16), etching, grooves, or other suitable features. Such features may also be provided in the shells of otherwise configured or functional container systems as disclosed herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A payload delivery unit for protecting and delivering a payload submerged in a submersion medium, the payload delivery unit comprising a container including:
   a pressure resistant shell defining a containment chamber and including first and second shell members having opposed first and second sealing faces, respectively; and
   a resilient seal device engaging and interposed between the first and second sealing faces;
   wherein the container is configured and constructed such that:
      when the submersion medium applies an exterior pressure to the first and second shell members such that a shell pressure differential, defined as the exterior pressure less an interior pressure of the containment chamber, exceeds a prescribed pressure, the first and second shell members compressively load and deform the seal device to effect a seal between the first and second shell members that prevents ingress of the submersion medium into the containment chamber, wherein the compressively loaded and deformed seal device operates as a biasing device tending to mechanically force the first and second shell members apart from one another; and when the shell pressure differential is less than the prescribed pressure, the seal device elastically rebounds to automatically mechanically force or assist in automatically mechanically forcing the first and second shell members apart from one another to permit ingress of the submersion medium into the containment chamber.

2. The payload delivery unit of claim 1 wherein the container is configured and constructed such that:

when the payload delivery unit is located at or below a prescribed depth in the submersion medium, the first and second shell members compressively load and deform the seal device to effect the seal between the first and second shell members to prevent ingress of the submersion medium into the containment chamber; and when the payload delivery unit is located above the prescribed depth, the seal device elastically rebounds to passively, automatically separate the first and second shell members to permit ingress of the submersion medium into the containment chamber.

3. The payload delivery unit of claim 2 wherein the prescribed depth is in the range of from about 0 to 100 meters.

4. The payload delivery unit of claim 2 wherein, when the payload delivery unit is located above the prescribed depth, the seal device rebounds to fully passively, automatically separate the first and second shell members to permit ingress of the submersion medium into the containment chamber.

5. The payload delivery unit of claim 1 including a pressure generator operable to selectively increase the interior pressure to actively reduce the pressure differential.

6. The payload delivery unit of claim 1 wherein the interior pressure of the containment chamber is less than atmospheric.

7. The payload delivery unit of claim 1 wherein the seal device is formed of an elastomeric material.

8. The payload delivery unit of claim 1 wherein the seal device has a durometer in the range of from about 10 to 90 Shore A.

9. The payload delivery unit of claim 1 wherein the first and second shell members are hemispherical, and the seal device and the first and second sealing faces are substantially annular.

10. The payload delivery unit of claim 1 wherein the first shell member has a seal channel defined in the first sealing face and the seal device is disposed in the seal channel.

11. The payload delivery unit of claim 1 wherein the seal device has a textured surface engaging at least one of the first and second shell members.

12. The payload delivery unit of claim 1 including a payload disposed in the containment chamber.

13. The payload delivery unit of claim 1 wherein the container is configured such that the first and second shell members fully separate and detach from one another after the first and second shell members are forced apart.

14. A method for protecting and delivering a payload submerged in a submersion medium, the method comprising:

providing a payload delivery unit comprising a container including:

a pressure resistant shell defining a containment chamber and including first and second shell members having opposed first and second sealing faces, respectively; and a resilient seal device engaging and interposed between the first and second sealing faces;

submerging the container with the payload mounted in the containment chamber;

maintaining the payload delivery unit in a sealed condition wherein the submersion medium applies an exterior pressure to the first and second shell members such that a shell pressure differential, defined as the exterior pressure less an interior pressure in the containment chamber, exceeds a prescribed pressure, whereby the shell members compressively load and deform the seal device to effect a seal between the first and second shell members that prevents ingress of the submersion medium into the containment chamber, wherein the compressively loaded and deformed seal device operates as a biasing device tending to mechanically force the first and second shell members apart from one another; and thereafter causing the shell pressure differential to become less than the prescribed pressure, whereupon the seal device elastically rebounds to automatically mechanically force or assist in automatically mechanically forcing the first and second shell members apart from one another to permit ingress of the submersion medium into the containment chamber.

15. The method of claim 14 wherein:

maintaining the payload delivery unit in a sealed condition includes maintaining the payload delivery unit at a first depth or depths at or below a prescribed depth in the submersion medium, responsive to which the first and second shell members compressively load and deform the seal device to effect the seal between the first and second shell members that prevents ingress of the submersion medium into the containment chamber; and causing the pressure differential to become less than the prescribed pressure includes permitting the payload delivery unit to rise to a second depth above the prescribed depth, responsive to which the seal device elastically rebounds to passively, automatically separate the first and shell members to permit ingress of the submersion medium into the containment chamber.

16. The method of claim 15 wherein, when the payload delivery unit is located at the second depth, the seal device elastically rebounds to fully passively, automatically separate the first and second shell members to permit ingress of the submersion medium into the containment chamber.

17. The method of claim 14 wherein:

the payload delivery unit includes a pressure generator; and causing the pressure differential to become less than the prescribed pressure includes selectively increasing the interior pressure to actively reduce the pressure differential using the pressure generator.

18. The method of claim 14 including, after and as a result causing the pressure differential to become less than the prescribed pressure and permit ingress of the submersion medium into the containment chamber, separating the first and second shell members and releasing the payload from the container.

19. The method of claim 14 including scuttling at least one of the first and second shell members after forcing the first and second shell members apart from one another.

20. The method of claim 14 including fully separating and detaching the first and second shell members from one another after the first and second shell members are forced apart.

* * * * *

UNITED STATES PATENT AND TRADEMARK OFFICE
CERTIFICATE OF CORRECTION

PATENT NO.         : 8,166,904 B2                                        Page 1 of 1
APPLICATION NO.    : 12/511676
DATED              : May 1, 2012
INVENTOR(S)        : Israel et al.

It is certified that error appears in the above-identified patent and that said Letters Patent is hereby corrected as shown below:

Column 20, Claim 15, Line 40: correct "first and shell members"
to read -- first and second shell members --

Signed and Sealed this
Thirteenth Day of November, 2012

David J. Kappos
*Director of the United States Patent and Trademark Office*